US009639985B2

(12) United States Patent
Robbins et al.

(10) Patent No.: US 9,639,985 B2
(45) Date of Patent: May 2, 2017

(54) ACTIVE BINOCULAR ALIGNMENT FOR NEAR EYE DISPLAYS

(71) Applicant: Microsoft Technology Licensing, LLC, Redmond, WA (US)

(72) Inventors: Steven John Robbins, Bellevue, WA (US); Drew Steedly, Redmond, WA (US); Nathan Ackerman, Seattle, WA (US); Quentin Simon Charles Miller, Sammamish, WA (US); Andrew C. Goris, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 13/925,624

(22) Filed: Jun. 24, 2013

(65) Prior Publication Data

US 2014/0375681 A1   Dec. 25, 2014

(51) Int. Cl.
*G06T 11/60* (2006.01)
*G02B 27/01* (2006.01)
(Continued)

(52) U.S. Cl.
CPC .......... *G06T 19/006* (2013.01); *G01B 11/272* (2013.01); *G02B 27/017* (2013.01);
(Continued)

(58) Field of Classification Search
CPC ... G06T 11/60; G02B 27/0101; G02B 27/017; G02B 27/0172; G02B 23/18; G02B 27/30; G02B 5/04; G01B 11/26
(Continued)

(56) References Cited

U.S. PATENT DOCUMENTS 4,500,200 A * 2/1985 Kleinhans .............. G01B 11/26
356/152.2
5,392,158 A * 2/1995 Tosaki ......................... 359/633
(Continued)

FOREIGN PATENT DOCUMENTS

WO   2013/022544 A1   2/2013

OTHER PUBLICATIONS

"International Search Report & Written Opinion for PCT Patent Application No. PCT/US2014/043098", Mailed Date: Oct. 14, 2014, 14 Pages. (MS# 338755.02).
(Continued)

*Primary Examiner* — Ke Xiao
*Assistant Examiner* — Andrew Shin
(74) *Attorney, Agent, or Firm* — Vierra Magen Marcus LLP

(57) ABSTRACT

A system and method are disclosed for detecting angular displacement of a display element relative to a reference position on a head mounted display device for presenting a mixed reality or virtual reality experience. Once the displacement is detected, it may be corrected for to maintain the proper binocular disparity of virtual images displayed to the left and right display elements of the head mounted display device. In one example, the detection system uses an optical assembly including collimated LEDs and a camera which together are insensitive to linear displacement. Such a system provides a true measure of angular displacement of one or both display elements on the head mounted display device.

23 Claims, 13 Drawing Sheets

(51) Int. Cl.
  *G02B 23/18* (2006.01)
  *G02B 27/30* (2006.01)
  *G01B 11/26* (2006.01)
  *G06T 19/00* (2011.01)
  *G01B 11/27* (2006.01)

(52) U.S. Cl.
  CPC .......... *G02B 2027/014* (2013.01); *G02B 2027/0129* (2013.01); *G02B 2027/0138* (2013.01); *G02B 2027/0178* (2013.01); *G02B 2027/0187* (2013.01)

(58) Field of Classification Search
  USPC ........... 345/619, 629, 633, 7–9; 382/154; 359/630–633, 480–482, 641, 407, 831, 359/834, 835; 356/138–155
  See application file for complete search history.

(56) References Cited

U.S. PATENT DOCUMENTS

| | | |
|---|---|---|
| 5,838,432 A | 11/1998 | Tokuhashi et al. |
| 2002/0063807 A1 | 5/2002 | Margulis |
| 2002/0163482 A1 | 11/2002 | Sullivan |
| 2002/0181115 A1 | 12/2002 | Massof et al. |
| 2005/0174651 A1* | 8/2005 | Spitzer et al. ............ 359/630 |
| 2010/0103196 A1 | 4/2010 | Kumar et al. |
| 2012/0113092 A1 | 5/2012 | Bar-Zeev et al. |
| 2012/0249797 A1 | 10/2012 | Haddick et al. |
| 2013/0038510 A1 | 2/2013 | Brin et al. |
| 2013/0050833 A1 | 2/2013 | Lewis et al. |

OTHER PUBLICATIONS

PCT Demand and Response to International Search Report and Written Opinion, filed Jan. 28, 2015 in PCT Patent Application No. PCT/US2014/043098.

"Precision Rotation Stage, Stepping Motor, Continuous 360° Motion, URS50", Retrieved from Internet on: Mar. 14, 2013, Available at: http://search.newport.com/?q=*&x2=sku&q2=URS50BPP.

"Second Written Opinion Issued in PCT Patent Application No. PCT/US2014/043098", Mailed Date: May 29, 2015, 8 Pages. (MS# 338755.02).

Response to Second Written Opinion filed Jul. 6, 2015 in PCT Patent Application No. PCT/US2014/043098.

* cited by examiner

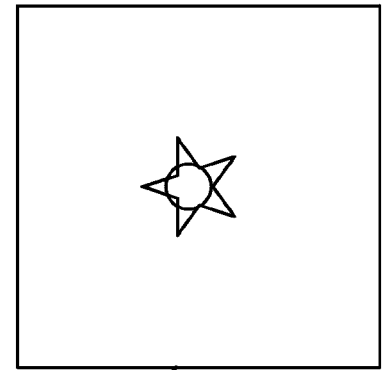
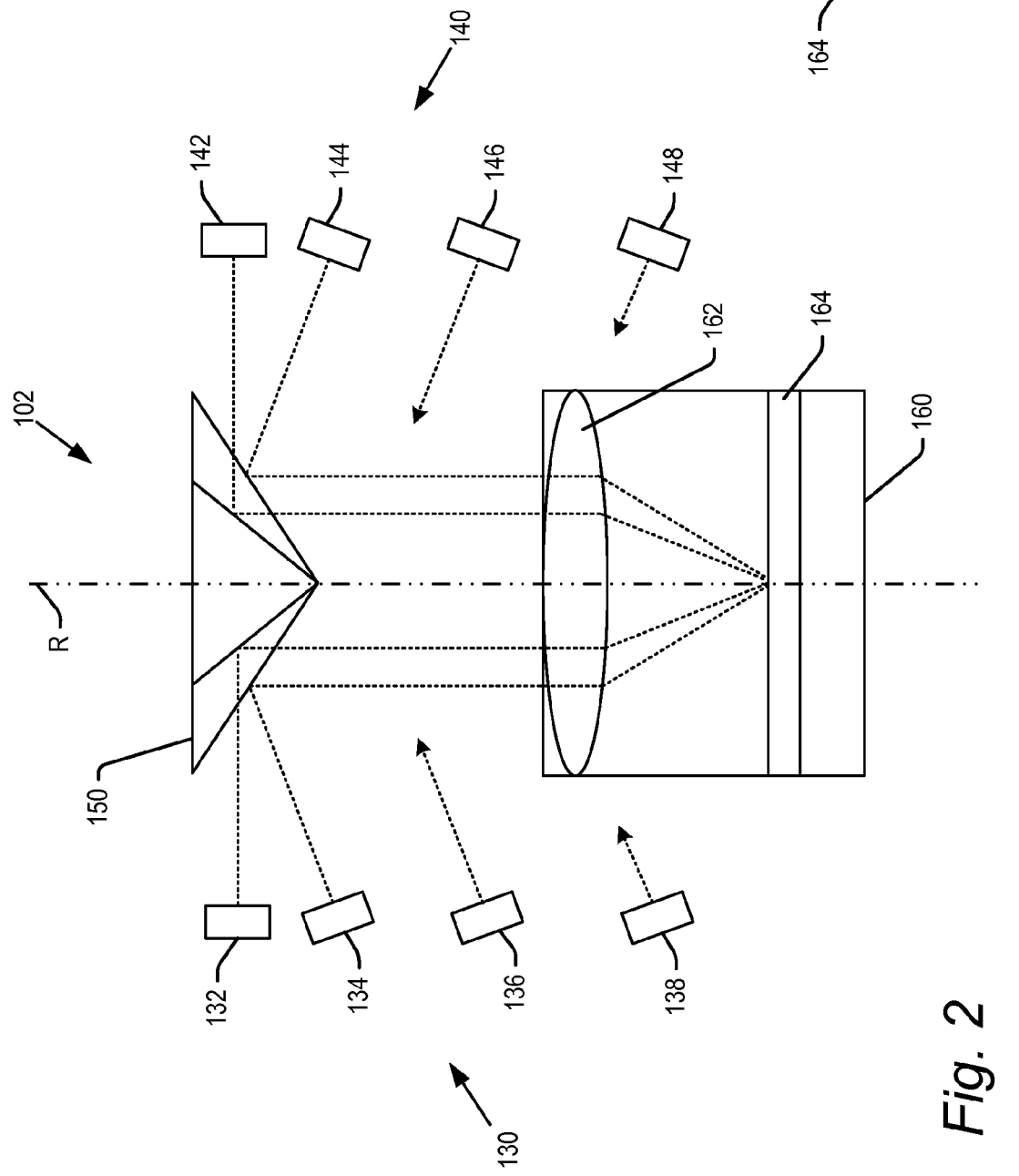

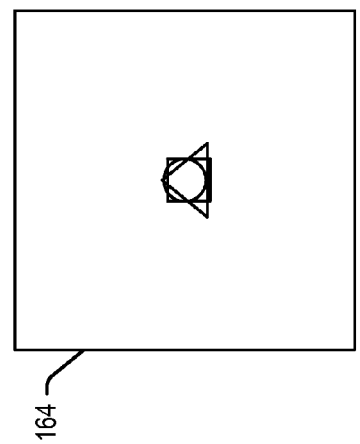
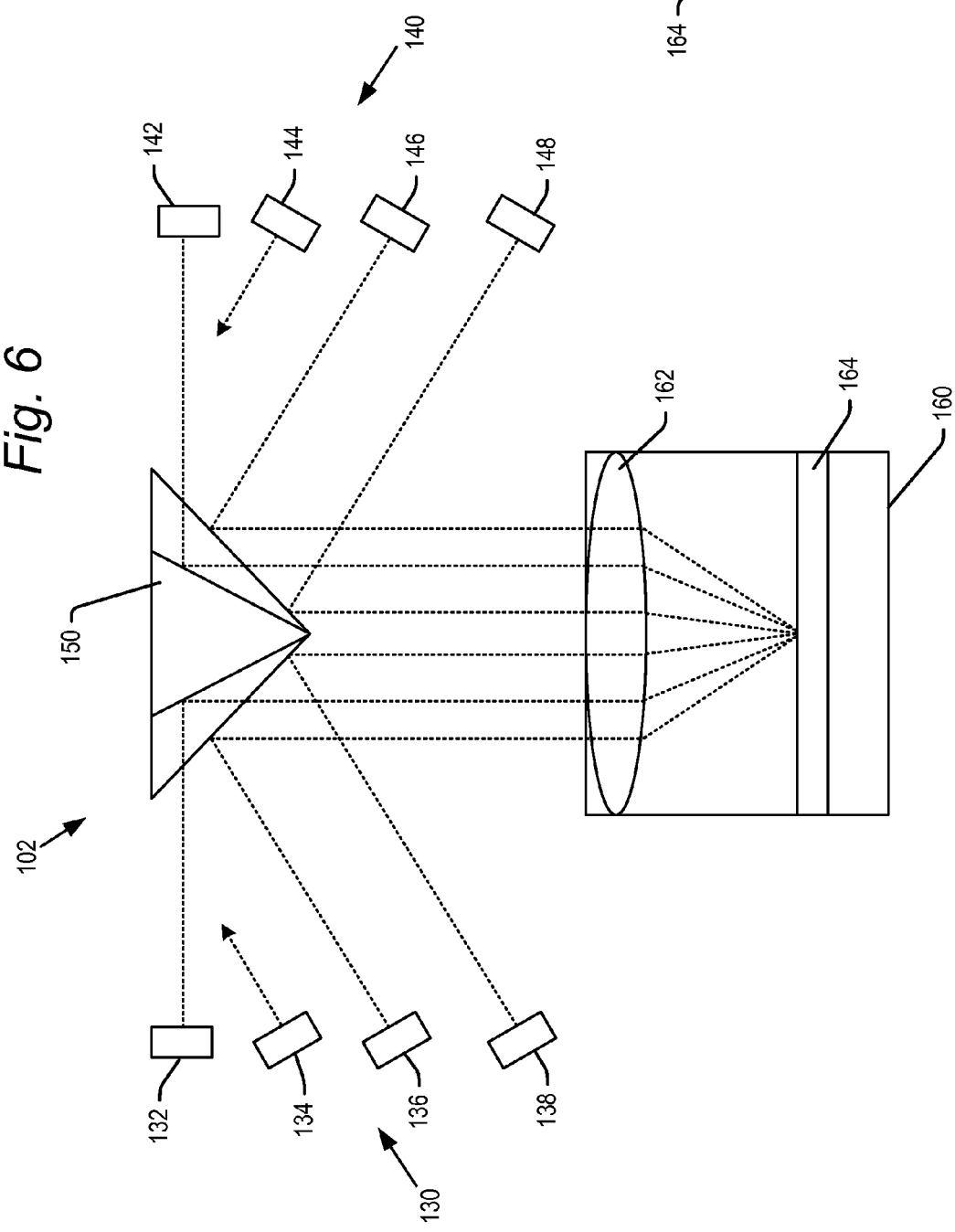

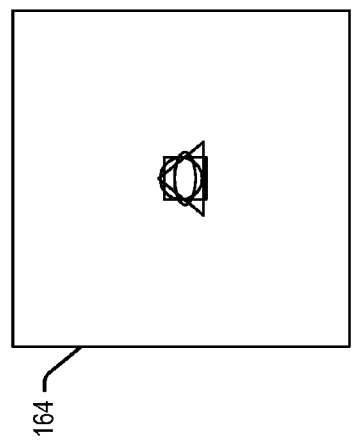
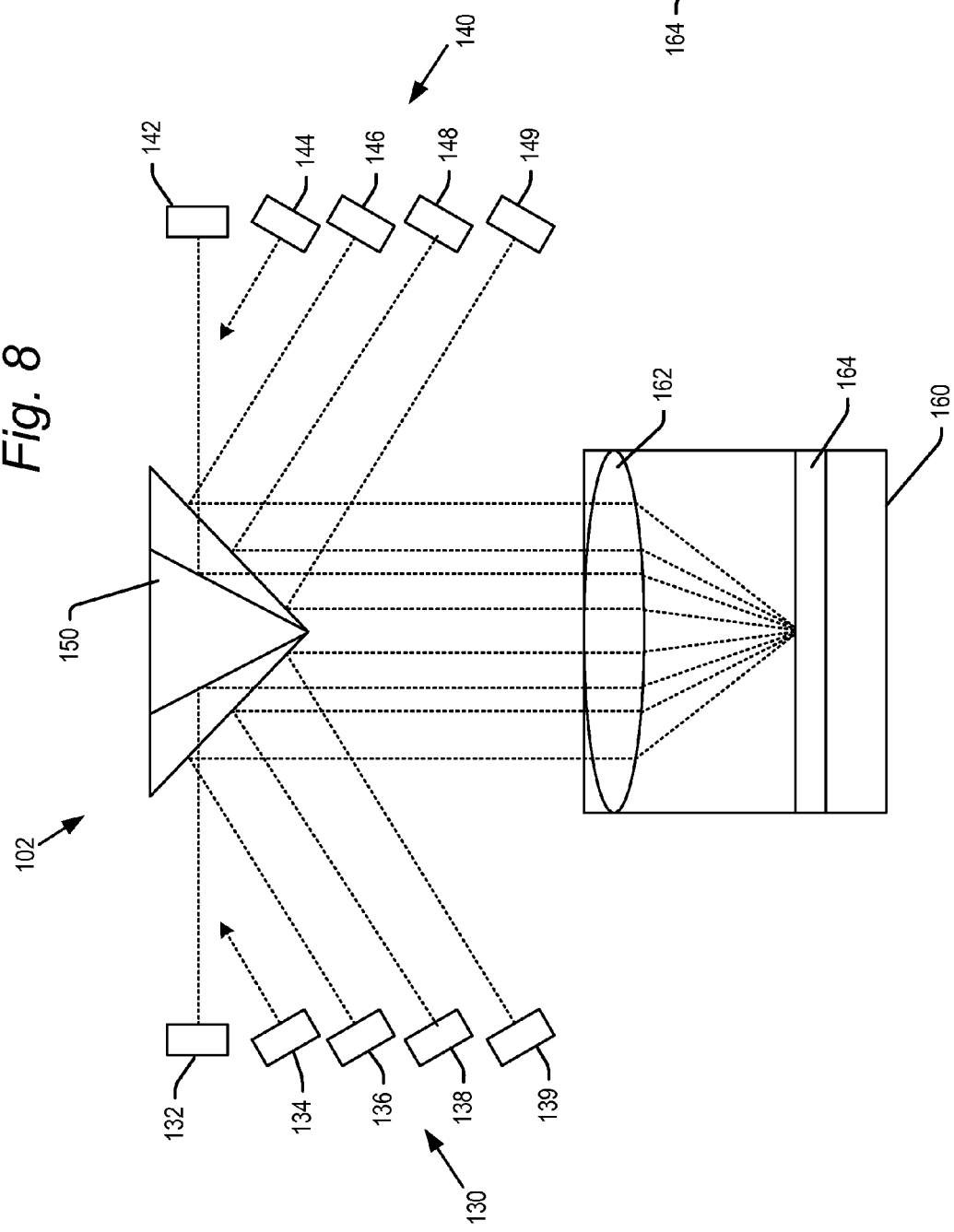

(Step 206)

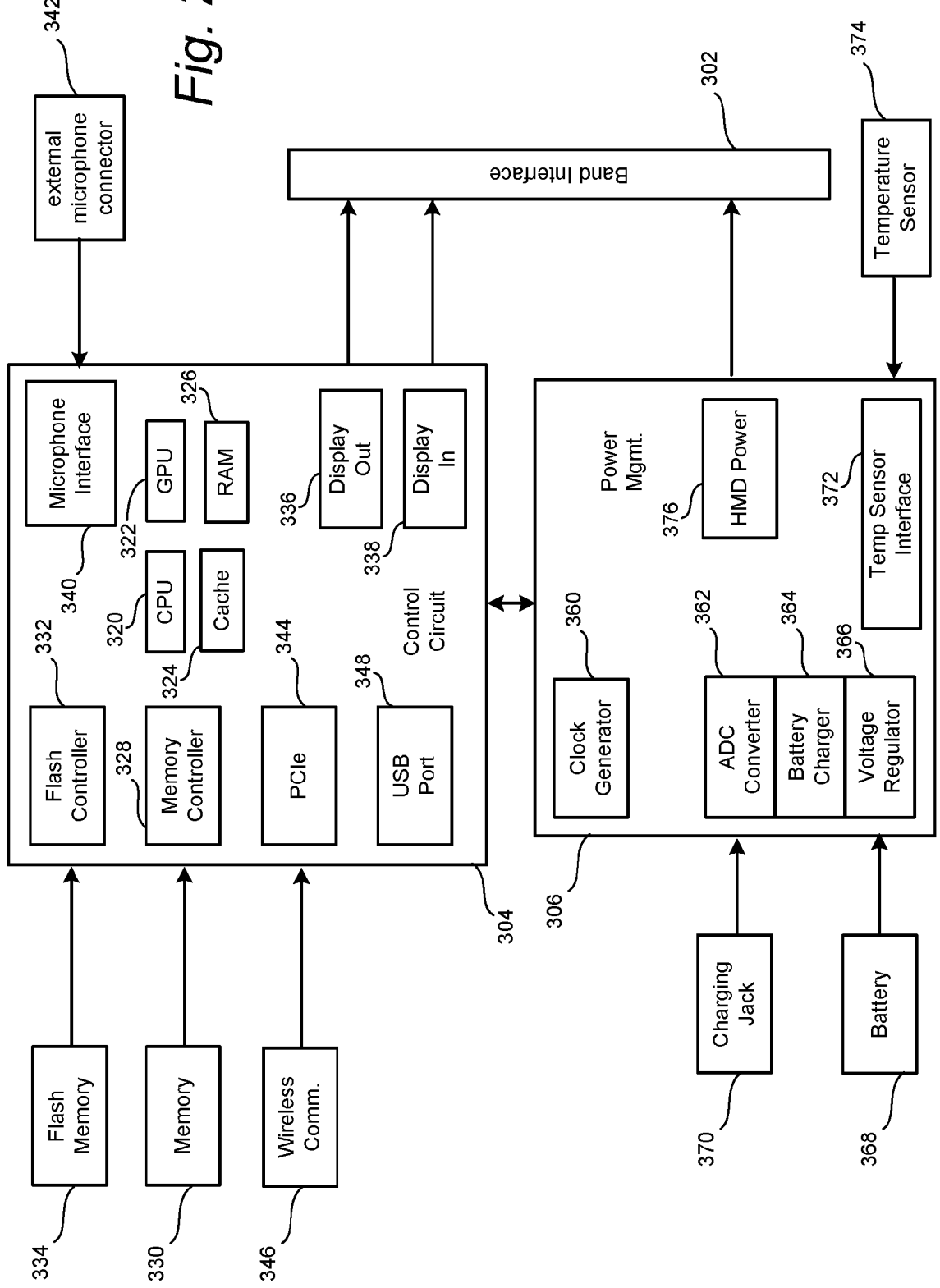

ACTIVE BINOCULAR ALIGNMENT FOR NEAR EYE DISPLAYS

BACKGROUND

Mixed reality is a technology that allows virtual imagery to be mixed with a real-world physical environment. A see-through, near eye display device may be worn on a user's head to view the mixed imagery of real objects and virtual objects displayed in the user's field of view. In order to facilitate the illusion of three-dimensional depth, images of virtual objects are displayed independently to the left and right eyes by the head mounted display device. Images on the left and right displays can be positioned such that the angles of virtual objects are the same as the binocular disparity created at the eyes by an object in the real world. This intentional horizontal binocular disparity (convergence or stereopsis) is closely matched to the horizontal parallax created between the horizontally displaced eyes and a virtual object at a defined distance. This binocular disparity is interpreted by the brain as indicative of a depth of the virtual object in the mixed reality environment. It is desirable to precisely control the binocular disparity of displayed images, as departures from the correct angles can cause a conflict with other visual cues such as motion parallax. These conflicts can diminish the users experience and worst case, the immersive experience can be lost. Furthermore, departures from alignment between the images in the vertical direction (vertical disparity or dipvergence) or divergent binocular disparity is unnatural and cannot be accommodated by the eye brain system. Even small deviations (for example 1-2 mRads) can create, discomfort and larger errors cannot be fused by the eye brain system at all, resulting in the virtual image to appear as a double image.

Optical display systems can be initially calibrated for accurate binocular disparity. However, typically head mounted display devices are light-weight, and can deform either under shock or when worn on a user's head. It is therefore required to detect displacement of the left eye piece relative to the right eye piece of the head mounted display with the aim of electronically or mechanically correct the displacement. In an example, a laser light source on one eye piece transmits across the nose bridge to a photo-detector array on the opposed eye piece. Relative movement of left and right eye pieces may result in a detectable change in where the laser strikes the photo-detector array to thereby indicate the relative displacement.

A shortcoming of such a detector system is that linear displacement of one eye piece relative to the other may not be discernible from angular displacement of one eye piece relative to the other. Both may result in the same measured displacement of the laser beam on the photo-detector array. While adding additional laser/photo-detector array pairs may provide additional information, there may still be some combinations of translation and/or rotation which are not discernible with such a detector system. Moreover, such a detector system only provides information regarding displacement of one eye piece relative to the other eye piece. The described conventional system is not able to provide information of absolute movement of one of the left and right eye pieces relative to a frame of the head mounted display.

SUMMARY

Embodiments of the present technology relate to a system and method for detecting angular displacement of a display element relative to a reference position on a head mounted display device for presenting a mixed reality or virtual reality experience. Once the displacement is detected, it may be corrected to maintain the proper binocular disparity of virtual images displayed to the left and right display elements of the head mounted display device. One embodiment of the detection system uses an optical assembly including collimated LEDs and a camera which together are insensitive to linear displacement. Such a system provides a true measure of angular displacement of one or both display elements on the head mounted display device.

In an example, the present technology relates to a system for detecting angular displacement of a display element relative to a reference position on a head mounted display device for displaying virtual images on the display element, the system comprising: an alignment detection assembly, comprising: an emitter affixed to one of the display element and the reference position, and a sensor affixed to the one of the display element and the reference position not including the emitter, the sensor capable of receiving emissions from the emitter, and the sensor capable of registering emissions from the emitter indicating an angular displacement of the display element while being insensitive to emissions from the emitter indicating a linear displacement of the display element; and a processing unit in communication with the alignment detection assembly and receiving feedback from the sensor, the processing unit determining the angular displacement of the display element from the feedback and the processing unit adjusting a display of the virtual images to the display element to compensate for the determined angular displacement of the display element.

In another example, the present technology relates to a system for detecting angular displacement of a first display element relative to a reference position on a head mounted display device for displaying virtual images to the first display element and a second display element with binocular disparity, the system comprising: an alignment detection assembly, comprising: a group of light sources for emitting light, a direction of light emitted from at least one light source in the group of light sources changing upon an angular displacement of the first display element and the direction of light emitted from the at least one light source changing upon a linear displacement of the first display element, a camera for receiving light from two or more light sources in the group of light sources, the camera comprising: a collimated lens for receiving the light from the two or more light sources, and an image plane for receiving light through the collimated lens, the camera registering an angular displacement of the first display element while being insensitive to a linear displacement of the display element; and a processing unit in communication with the alignment detection assembly and receiving feedback from the camera, the processing unit determining the angular displacement of the first display element from the feedback and the processing unit adjusting a display of the virtual images to the first display element to correct a change in the binocular disparity due to the angular displacement of the first display element.

In a further example, the present technology relates to a method of detecting angular displacement of a first display element relative to a reference position on a head mounted display device for displaying virtual images to the first display element and a second display element with binocular disparity, the method comprising: (a) collimating light from a first light source on the first display element; (b) collimating light from a second light source on the second display element; (c) directing the collimated light from the first and second light sources into a camera; (d) collimating the light received in the camera so that the camera is sensitive to angular displacements of the light received from the first and second light sources and is insensitive to linear displacements of the light received from the first and second light sources; and (e) determining an angular displacement of the first display element based on an angular displacement of the light received in the camera from the first and second light sources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an enlarged top view of the alignment detection assembly according to embodiments of the present technology.

FIG. 3 is a front view of a photo-detector image plane of a camera of an alignment detection assembly according to embodiments of the present technology.

FIG. 6 is an enlarged top view of the alignment detection assembly according to embodiments of the present technology.

FIG. 7 is a front view of a photo-detector image plane of a camera of an alignment detection assembly according to embodiments of the present technology.

FIG. 8 is an enlarged top view of the alignment detection assembly according to a further embodiment of the present technology.

FIG. 9 is a front view of a photo-detector image plane of a camera of an alignment detection assembly according to embodiments of the present technology.

FIG. 25 is a block diagram of a processing unit which may be used with the head mounted display device in embodiments of present technology.

DETAILED DESCRIPTION

Embodiments of the present technology will now be described with reference to FIGS. 1-25, which in general relate to an alignment detection assembly and method used in a head mounted display device for presenting a mixed reality or virtual reality experience. The alignment detection assembly may detect alignment of one or both display elements of a head mounted display device relative to a reference position of the device. In embodiments, information from the alignment detection assembly may be used as part of a closed loop feedback system to adjust the binocular disparity with which images are displayed to the left and right display elements of the head mounted display device. In this way, the illusion of three-dimensional depth of the displayed virtual objects may be maintained.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially," "approximately" and/or "about" mean that the specified dimension or parameter may be varied within an acceptable manufacturing tolerance for a given application. In one embodiment, the acceptable manufacturing tolerance is ±0.25%.

Figure 1:
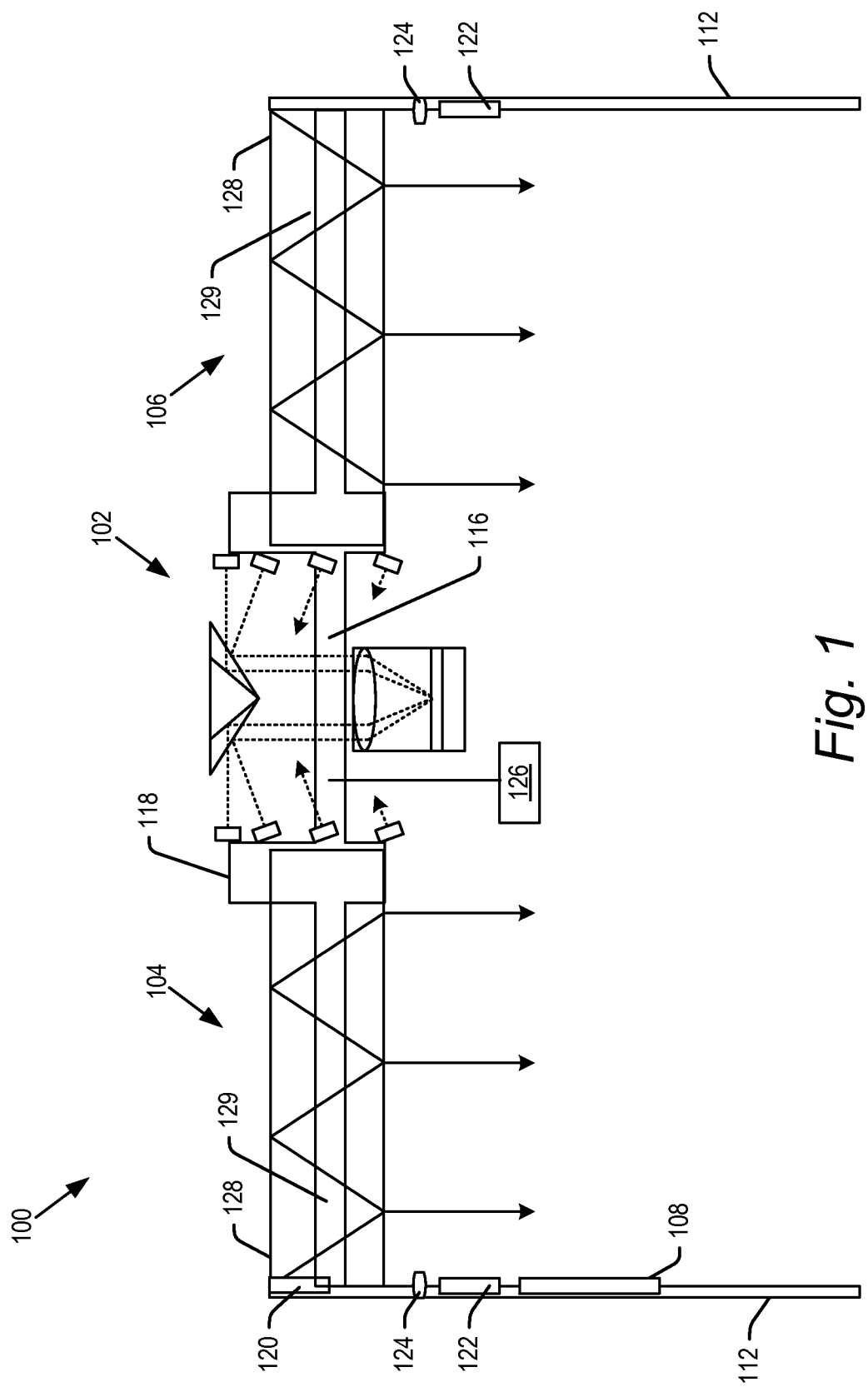
FIG. 1 is a top view of a head mounted display device including an alignment detection assembly according to embodiments of the present technology.

FIG. 1 is a top view of a head mounted display device 100 including an alignment detection assembly 102. Head mounted display device 100 may have a wide variety of components and features, but in general is used to present a mixed reality environment to a user wearing the device 100. In an alternative, the head mounted display device 100 may be used to provide a purely virtual reality environment, i.e., one where real-world objects are blocked from view and just virtual objects are displayed. Some of the components and features of the head mounted display device 100 are described below, but further details of an example of a head mounted display device 100 with which an alignment detection assembly 102 may be used are disclosed in U.S. Published Patent Application No. 2012/01272284, entitled, "Head-Mounted Display Device Which Provides Surround Video," which application published on May 24, 2012.

In embodiments, the head mounted display device 100 may include a pair of display elements 104, 106 associated respectively with the left and right eyes of a user. The display elements 104, 106 are to a degree transparent so that a user can look through the display elements at real-world objects within the user's field of view (FOV). The display elements also provide the ability to project virtual images into the FOV of the user such that the virtual images may also appear alongside and mixed with the real-world objects. A virtual object may be projected to the display elements 104, 106 with binocular disparity accounting for parallax so as to create the illusion of three-dimensional depth of the virtual object. In embodiments, the head mounted display device 100 may automatically track where the user is looking so that the system can determine where to insert the virtual image(s) in the FOV of the user. Once the system knows how and where to project the virtual images to the respective display elements, the images are projected using the display elements.

The head mounted display device 100 may include an integrated processing unit 108. The device 100 may be in communication with a separate processing unit 108 via a wired or wireless connection in further embodiments. In embodiments, the head mounted display device 100 including its processing unit 108 may build a model of the mixed reality environment including the x, y, z, pitch, yaw and roll positions of users, real-world objects and virtual three-dimensional objects in the environment. Details of one example of a processing unit 108 are described below with respect to FIG. 25. Processing unit 108 may include additional or alternative components in further embodiments.

In addition to display elements 104 and 106, head mounted display device 100 may further include temple arms 110, 112, a nose bridge 116 and a frame 118. The alignment detection assembly 102 may have portions mounted on the display elements 104 and 106 (as explained below), and the display elements 104 and 106 may be mounted to frame 118. In embodiments, frame 118 can be formed of a rigid material, such as for example polycarbonate or other plastics. The illustrated configuration of frame 118 is by way of example only, and may have a wide variety of other configurations in supporting the display elements 104, 106 and alignment detection assembly 102.

Different users have different inter-pupillary distances, and a head mounted display device 100 of one size may not fit all users. In embodiments, therefore, frame 118 may be formed with a mechanism 126 (shown schematically in FIG. 1) to allow adjustment of the distance between display element 104 and display element 106, referred to as the inter-pupillary distance, or "IPD."

As explained below, in addition to sensing angular displacement, for example from mechanical slop or tolerance in the IPD adjustment mechanism, the alignment detection assembly 102 also provides a measure of the IPD. Knowing where the display elements 104, 106 are with respect to each other may be used to determine how images are displayed to the display elements 104 and 106. In particular, the head mounted display device 100 will calculate the placement of a virtual object in the display elements 104, 106 (in angular space) according to a determined Z-axis depth of that virtual object in three-dimensional space. The calculation for this placement employs the distance between the display elements 104, 106. In one embodiment, this distance may range between 51 mm-74 mm, though this range may be larger or smaller than that in further embodiments.

The mechanism 126 allowing adjustment of the IPD may operate according to a variety of mechanical schemes. One example is set forth in U.S. Published Patent Application No. 2013/0050833, entitled, "Adjustment of a Mixed Reality Display For Inter-Pupillary Distance Alignment," which application was published on Feb. 28, 2013.

In one example of an IPD adjustment mechanism, frame 118 may be a single rigid structure, and the display elements 104, 106 may be mounted for translation toward and away from each other on the frame 118. As one of many examples, frame 118 may include a threaded rod or rail, with the display elements 104, 106 being affixed to the rail. The threads of the rail mating with display element 104 may be opposite to the threads mating with display element 106, such that rotation of the rail moves the display elements 104, 106 along the threads closer to and farther from each other, depending on the direction the rail is rotated. The display elements 104, 106 may be translatably affixed to frame 118 by a variety of other mechanical systems, some of which are disclosed in U.S. Published Patent Application No. 2013/0050833, entitled, "Adjustment of a Mixed Reality Display For Inter-Pupillary Distance Alignment," mentioned above.

In a further mechanical scheme, the frame 118 may be formed of two sections, a first fixedly mounted to display element 104 and a second fixedly mounted to display element 106. The two sections are capable of moving toward or away from each other to adjust the IPD of the head mounted display device 100. The two sections of the frame 118 may be adjustable with respect to each other to adjust the IPD distance by a variety of mechanical systems, such as for example telescoping sections with one section threaded into the other. Other mechanical mechanisms 126 allowing adjustment of the IPD are contemplated. These mechanisms 126 may operate manually or automatically under user control.

A scene facing camera 120 may be provided at the front of one or both display elements 104, 106 that can capture video and still images. Those images are transmitted to processing unit 108 to assist in building the scene map and orienting the head mounted display device 100 within the scene map.

Each display element 104, 106 may include a variety of dedicated components for displaying the virtual images. In embodiments, each display element 104, 106 may include an image source, which in one embodiment may include a microdisplay 122 for projecting a virtual image and lens 124 for directing images from microdisplay 122 into a light-guide optical element 128. In one embodiment, lens 124 may be a collimated lens.

Each light-guide optical element 128 may be provided on or in a see-through lens 129 of display elements 104, 106. Each light-guide optical element 128 channels virtual images from its associated microdisplay 122 through lens 129 toward respective eyes of the user (as indicated by the arrows from display elements 104, 106) via diffractive gratings and other optical components. The light-guide optical elements 128 also allow light from in front of the head mounted display device 100 to be transmitted through the light-guide optical elements 128 and lenses 129 to the eyes of a user. See-through lenses 129 may be standard lenses used in eye glasses and can be made to any prescription (including no prescription).

FIG. 2 is an enlarged top view of the alignment detection assembly 102 for determining the alignment of display elements 104 and 106 with respect to a reference position on the head mounted display device 100. In embodiments, the reference position may be frame 118 or a portion of frame 118. In such an example, the alignment detection assembly 102 is capable of determining an alignment of display element 104 with respect to frame 118, and independently, an alignment of display element 106 with respect to frame 118. In further embodiments, the reference position be one of display elements 104, 106. In such an example, the alignment detection assembly 102 is capable of determining alignment of display element 104 with respect to display element 106, and vice-versa.

As shown in FIG. 2, alignment detection assembly 102 may include a number of emitters in a first group of light sources 130 and in a second group of light sources 140. The first group of light sources 130 (also referred to herein as first group 130) may be mounted to display element 104, and the second group of light sources 140 (also referred to herein as second group 140) may be mounted to display element 106, or vice-versa. The light sources in the first and second groups 130, 140 may be placed at mirror image positions with respect to a reference plane R extending into and out of the page of the illustration of FIG. 2 bisecting the head mounted display device 100. In the example shown in FIG. 2, the first group of light sources 130 may include a first light source, referred to herein as orthogonal light source 132, and second, third and fourth light sources, referred to herein as angled light sources 134, 136 and 138. Similarly, the second group of light sources 140 may include an orthogonal light source 142 and angled light sources 144, 146 148. As explained below, the number of light sources in first group 130 and second group 140 may vary in further embodiments.

Figure 4:
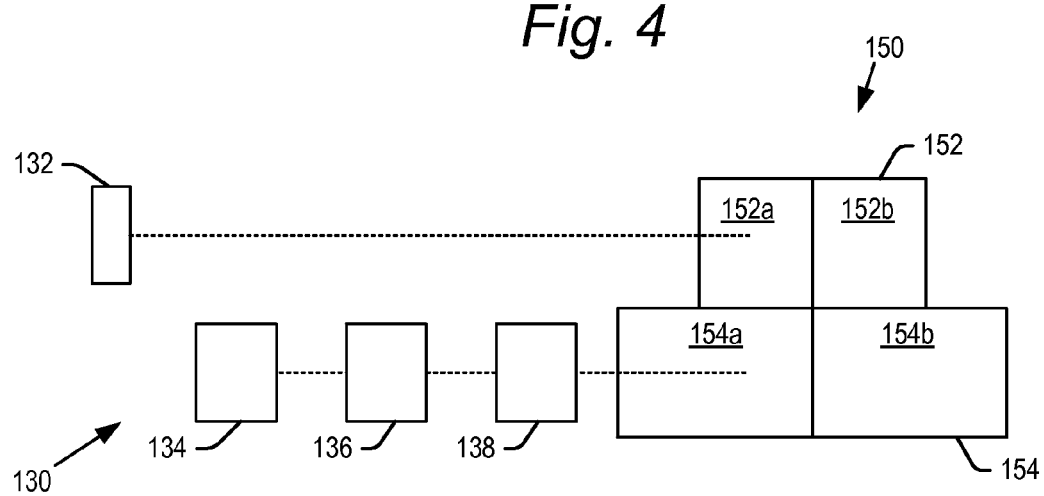
FIG. 4 is a front view of a portion of an alignment detection assembly according to embodiments of the present technology.

As seen for example in FIG. 4, the angled light sources in the first and second groups 130, 140 may lie in a row, coplanar with each other (for example horizontally coplanar). The orthogonal light sources in the first and second groups 130, 140 may be offset from the row of angled light sources (for example vertically offset). In the illustrated example, the orthogonal light sources are offset above the angled light sources, but the orthogonal light sources may be offset below the angled light sources in further embodiments.

In an example, each of the light sources in the first and second groups 130, 140 may be an LED emitting light which is collimated via a lens (not shown) so as to be focused at infinity. In this example, the LEDs in the first and second groups 130, 140 may emit infrared (IR) light at a wavelength of 850 nm, but it is understood that other types of LEDs may be used. Light sources from the first and/or second groups may be laser light in further embodiments. Where a laser is used as the source of light, a single laser in each group 130, 140 may be split into the various sources of light in each group 130, 140 using diffractive lenses. The diffractive lenses may be a variety of types including holographic, surface relief or kinoform.

The emissions of collimated light from one or more of the light sources in the first and second groups 130, 140 may be received within an image sensor, referred to herein as camera 160. Camera 160 may be a known device including an array of photo detectors such as for example a CMOS image sensor. In one example, camera 160 may be an OmniPixel3-GS sensor from OmniVision Technologies, Inc. of Santa Clara, Calif. Such a camera may have a 400×400 resolution with 3 micron (μm) pixels and a 1248 μm×1248 μm image area. These specifications are by way of example only, and camera 160 may be other types of image sensors having other parameters in further embodiments.

Camera 160 may include a collimated lens 162 and an image plane 164 of photo detectors placed at the focal length of the collimated lens 162. As explained in greater detail below, collimated lens 162 focuses light rays incident thereon which are parallel to an optical axis of the collimated lens approximately down to a single point or area on the image plane 164.

Light from the light sources in the first and second groups 130, 140 is redirected toward camera 160 via a reflective element 150. Without the element 150, the camera 160 would need to detect light directly from the orthogonal light source and the angled light source(s) from groups 130, 140. This is a possibility in the present technology, but may use a relatively high resolution photo-detector image plane 164 with a wide FOV to detect light from both the orthogonal and angled light sources. By use of the reflective element 150, light from the orthogonal and angled light sources may be directed down the center of the camera 160. This provides greater angular resolution, lessening the constraints on the type of camera 160 which may be used.

In embodiments, reflective element 150 may be a prism, having first and second halves symmetric about the reference plane R. The prism may be mounted to the frame 118. With this symmetry, one prism may be used to redirect light from both light source groups 130, 140 down into the camera 160. However, in further embodiments, two separate prisms may be used—one redirecting light from the light sources in the first group 130, and a second for redirecting light from the light sources in the second group 140.

Figure 5:
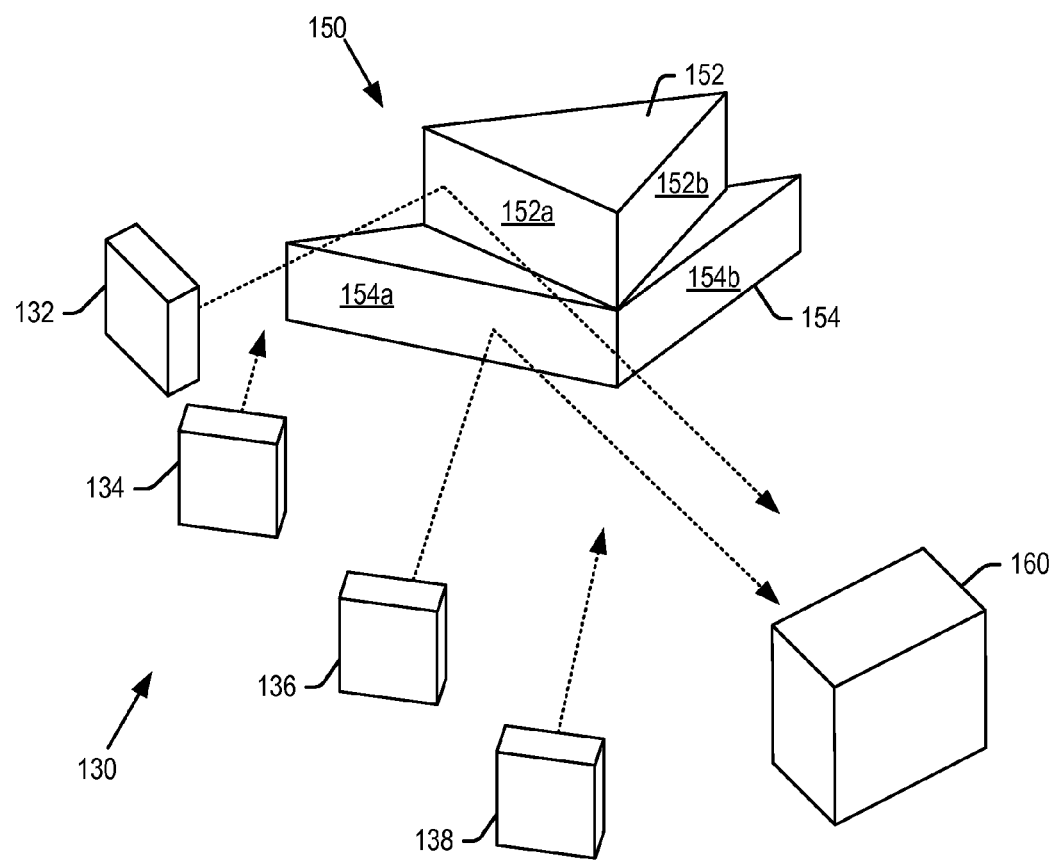
FIG. 5 is a perspective view of a portion of an alignment detection assembly according to embodiments of the present technology.

As indicated in FIGS. 2, 4 and 5, the reflective element 150 may be multifaceted having a top section 152 with side surfaces 152a, 152b forming an angle of 45° relative to the reference plane R. Reflective element 150 may further include a bottom section 154 with side surfaces 154a, 154b forming an angle of 60° relative to the reference plane R. As noted below, these angles may vary in further embodiments.

The angles of the side surfaces of the top and bottom sections 152, 154 of reflective element 150 are selected so as to redirect light from at least some of the light sources in the first and second groups 130, 140 into the camera 160. As noted above, the orthogonal light sources 132, 142 are offset from the row of angled light sources 134, 136, 138, 144, 146, 148. The orthogonal light sources 132, 142 and the side surfaces 152a, 152b of the top section 152 may be coplanar and are positioned such that the collimated light emitted from the orthogonal light sources strike the side surfaces 152a, 152b and are redirected into the camera 160 parallel to the optical axis of collimated lens 162 (assuming the display elements 104 and 106 are in proper alignment as explained below).

In embodiments, collimated light may be emitted from orthogonal light sources 132, 142 at an angle perpendicular to the reference plane R (also perpendicular to the optical axis of collimated lens 162 of camera 160). As explained below, this may be parallel to a direction with which display elements 104, 106 move toward and away from each other for IPD adjustment. Given this parallelism, the position with which light from orthogonal light sources 132, 142 strike beside surfaces 152a, 152b does not change with a change in IPD. Thus, each of the first and second groups of light sources 130, 140 may include a single orthogonal light source.

Moreover, given the symmetry of the alignment detection assembly 102 around reference plane R, and given that light from both groups of light sources 130, 140 are focused into a single camera 160, providing side surfaces 152a, 152b at 45° properly redirects the light from orthogonal light sources 132, 142 parallel to the optical axis collimated lens 162.

However, it is conceivable that side surfaces 152a, 152b may be angles of other than 45°, at which point collimated light from the orthogonal light sources 132, 142 may not converge to a single point on the image plane 164 through collimated lens 162. As long as these positions on image plane 164 are calibrated for initially (as explained below) and known, the alignment detection assembly 102 may still sense angular displacement (as also explained below).

As also seen in FIGS. 2, 4 and 5, the side surfaces 154a, 154b of the bottom section 154 lie in a plane of the light emitted from angled light sources 134, 136 and 138 in the first group 130, and light sources 144, 146 and 148 in the second group 140. The angled light sources and the side surfaces 154a, 154b of the bottom section 154 may be positioned such that the collimated light emitted from the angled light sources strike the side surfaces 154*a*, 154*b* and are redirected into the camera 160 parallel to the optical axis of collimated lens 162 (assuming the display elements 104 and 106 are in proper alignment as explained below).

In embodiments, given the, for example, vertical offset of the orthogonal and angled light sources, collimated light from the orthogonal light sources 132, 142 may travel to the camera 160 in a first plane, and collimated light from at least some of the angled light sources 134, 136, 138, 144, 146, 148 may travel to the camera in a second plane. In embodiments, these first and second planes may be parallel. Upon striking the collimated lens 162, light from these respective first and second planes may converge to a single central point or area on the image plane 164 (assuming the display elements 104 and 106 are in proper alignment as explained below). This convergence point or area is illustrated in FIG. 3.

FIGS. 2 and 3 illustrate an example where light from light sources 132, 134, 142 and 144 are received in the camera 160 and focused down to a central point or area of the image plane 164. It is conceivable that the image plane 164 could be partitioned, for example into quadrants, and each quadrant receives light from a different light source. However, by focusing each of the light sources to a single point or area (and distinguishing the different sources as explained below), the angular resolution of the image plane 164 may be increased 4× over a quadranted image plane.

There are several methods for distinguishing light from the various light sources incident upon the image plane 164. In one example, patterned shadow masks may be placed in front of the light sources which shape the collimated light into distinguishable shapes. Alternatively or additionally, light from the various light sources may be pulsed on and off in a predetermined time sequence which is different for each light source. Alternatively or additionally, light from the various light sources may be emitted at a given frequency which is different for each light source. The distinctions in the emitted light for each of these methods are detectable by the image plane 164 so that the processing unit 108 (in communication with image plane 164) is able to determine the light source of light incident thereon, even where light for more than one light source converges onto a common point as shown in FIG. 3.

In the illustrated example, light from orthogonal light sources 132, 142 may be shaped as a circle, and light from the angled light sources 134, 144 may be shaped as a star. In order to distinguish light from the first group 130 from the second group 140, the light from the first group 130 may be time sequenced with a first periodicity, and the light from the second group 140 may be time sequenced at a second periodicity. It is understood that the light from light sources 132, 134, 142 and 144 in FIGS. 2 and 3 may be distinguishable from each other by any of the methods described above.

As noted above, orthogonal light sources 132, 142 may emit collimated light that is parallel to a direction with which display elements 104, 106 move toward and away from each other for IPD adjustment. As such, moving the orthogonal light sources 132, 142 closer to or farther from reflective element 150 may not change the point where the light strikes the side surfaces 152*a*, 152*b*. Accordingly, assuming no angular displacement of the orthogonal light sources 132, 142, collimated light from orthogonal light sources 132, 142 will focus to the approximately same point(s) on the image plane as the IPD is adjusted.

Conversely, as collimated light from the angled light sources 134, 136, 138, 144, 146, 148 is not parallel to the direction of IPD adjustment, light from these sources will linearly translate on the side surfaces 154*a*, 154*b* upon IPD adjustment. Consequently, it may happen that the camera 160 receives light from just some of the angled light sources 134, 136, 138, 144, 146 and 148. The alignment detection assembly 102 in conjunction with the processing unit 108 may use the information of which angled light sources provide light received within camera 160 to discern IPD. This information may be used to adjust the stereopsis angle of the display to display elements 104, 106, as explained below.

In FIG. 2, the IPD may be adjusted to be relatively close together, and just light from angled light sources 134 and 144 is received within camera 160. In the view of FIG. 5, the IPD may have been adjusted to be larger than in FIG. 2, so that light from angled light sources 134 and 144 is no longer received in camera 160. Instead, light from light sources 136 and 146 is received within the camera 160. (FIGS. 4 and 5 show light sources from the first group 130; light sources from the second group 140 have been omitted for clarity, but may also be present and reflected in the same manner).

In FIG. 6, the IPD may have been adjusted to be larger than in FIG. 5. In this example, light from angled light sources 136, 138, 146 and 148 is received within camera 160. In an example where patterned shadow masks are placed in front of the light sources to create collimated light emitted in a pattern, the receipt in camera 160 of light from the orthogonal light source and two of the angled light sources from each of the first and second groups 130, 140 may create a pattern on image plane 164 as shown in FIG. 7. FIG. 7 shows the image plane receiving light shaped in a circle, a square and a triangle, representing the orthogonal light source and two angled light sources from each of the first and second groups 130, 140. As noted above, the light sources from the first group 130 may be discerned from the second group 140 for example by time sequencing or light wavelength.

Using the information of which angled light sources are providing light which is received within camera 160, the processing unit 108 may discern the IPD and how far part the display elements 104 and 106 are. FIGS. 2 and 5 illustrate examples where the camera 160 receives light from a single angled light source from each of the first and second groups 130, 140. FIG. 6 illustrates an example where light from two angled light sources from each of the first and second groups 130, 140 are received in camera 160. It is understood that at times during IPD adjustment, light from three of the angled light sources in each of the first and second groups 130, 140 may be received in camera 160.

Moreover, as noted above, there may be more than three angled light sources in each of the first and second groups 130, 140 in further embodiments. For example, FIGS. 8 and 9 illustrate an example where a fourth angled light source 139 is added to the first group 130 and a fourth angled light source 149 is added to the second group 140. In the illustrated example, at a point during IPD adjustment, light from orthogonal light sources 132, 142 and angled light sources 136, 138, 139 and 146, 148, 149 may be received within the camera 160. The processing unit 108 may use this information for a more detailed determination of the IPD and how far apart the display elements 104 and 106 are. More angled light sources are contemplated in further embodiments. Additional methods for determining IPD for the pattern of light received in camera 160 are explained below.

Instead of having individual light sources in the first and second groups 130, 140, there may be a single light source which is then split into several beams of collimated light, each distinguishable from each other. For example, a single light source may be split by diffractive gratings into different beams of collimated light, and these respective beams may be distinguished by any of the methods described above. A single light source split in this manner may be used instead of some or all of the angled light sources. This same light source may also be used instead of the orthogonal light source, with mirrors provided to direct the beam parallel to a direction with which display elements 104, 106 move as described above.

The light sources in the first group of light sources 130 may be directly affixed to the display element 104, and the light sources in the second group of light sources 140 may be directly affixed to the display element 106. As such, angular displacement (pitch, yaw and/or roll) of the display element 104 will result in a corresponding angular displacement of the light sources in the first group 130. The same is true for angular displacement of display element 106 and the light sources in the second group 140. As explained in greater detail below, an angular displacement of the light sources in the first and/or second groups 130, 140 registers in the camera 160 by shifting the light from the light sources on the image plane 164, which can be measured and characterized to come up with the angular displacement of the display element 104 and/or 106.

As described above, the IPD may be adjusted, which change may be detected by the alignment detection assembly 102. However, there may be parasitic components of linear displacement due to mechanical slop and tolerances of the components of the IPD adjustment mechanism. Parasitic linear displacement may occur for other reasons as well. It is desirable that this linear displacement not confound the measurement of angular displacement of the display elements 104, 106.

It is therefore a feature of the present technology that the alignment detection assembly 102 is insensitive to linear displacement of the display elements 104 and 106 relative to frame 118 (except with respect to sensing which of the angled light sources register within the camera 160 as described above). In contrast to conventional systems, this allows the alignment detection assembly 102 to measure angular displacement without uncertainty as to whether the system is measuring angular displacement or linear displacement.

Figure 10:
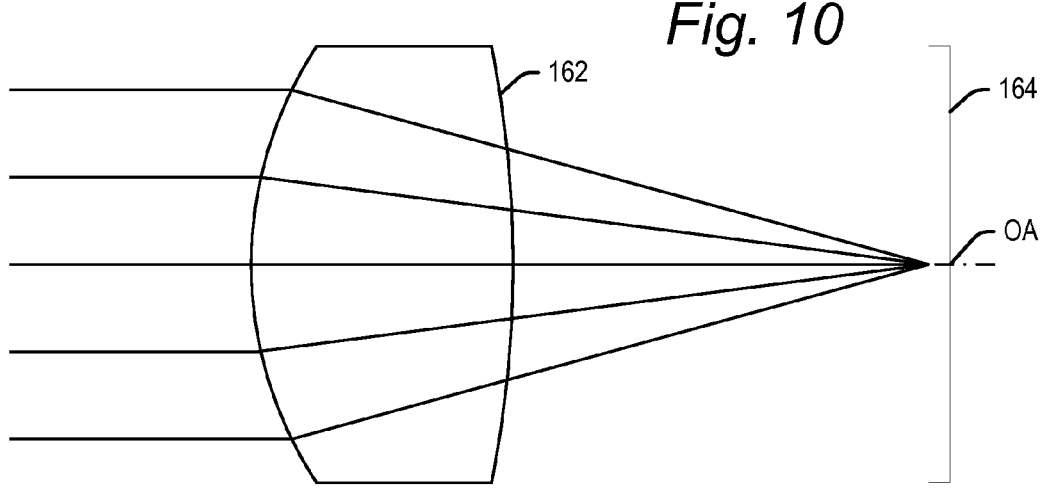
FIG. 10 is a top view illustrating the translation-insensitive aspects of the alignment detection assembly capable of measuring angular displacement.

For example, referring to the top view of lens 162 in FIG. 10, when collimated light is received parallel to the optical axis, OA, of collimated lens 162 (at least a portion of which is shown in FIG. 10) of camera 160, collimated light rays converge to the optical axis on the image plane 164. As noted above, the light sources 132, 134, 136 and 138 of the first group 130 are affixed and move with display element 104. Similarly, the light sources 142, 144, 146 and 148 of the second group 140 are affixed to and move with the display element 106.

A translation of the display element 104, 106 in the X direction (the direction of IPD adjustment and up/down in the top view illustration of FIG. 10) will shift the collimated light from one or more of the light sources on the collimated lens 162 up/down in the top view illustration of FIG. 10. However, this light will still converge to the optical axis at the image plane 164.

A translation of the display element 104, 106 in the Y direction (generally up and down with respect to a front surface of the head mounted display device 100 and into/out of the page of the top view illustration of FIG. 10) will shift the collimated light from one or more of the light sources on the collimated lens 162 into/out of the page of the top view illustration of FIG. 10. However, this light will still converge to the optical axis at the image plane 164.

A translation of the display element 104, 106 in the Z direction (generally toward and away from a front surface of the head mounted display device 100 and left/right on the top view illustration of FIG. 10) will have no effect on where the collimated light from one or more of the light sources arrives at the collimated lens. This light will continue to converge to the optical axis at the image plane 164.

By contrast, a change in the angular displacement of the display elements 104, 106 relative to a reference position on the head mounted display device 100 may result in a detectable change in how and where light from one or more of the light sources strikes the image plane 164. This angular displacement may come from a variety of sources including for example mechanical slop in IPD adjustment mechanism 126, shock to the head mounted display device 100 and/or deformation of the head mounted display device 100 on a user's head.

Figure 11:
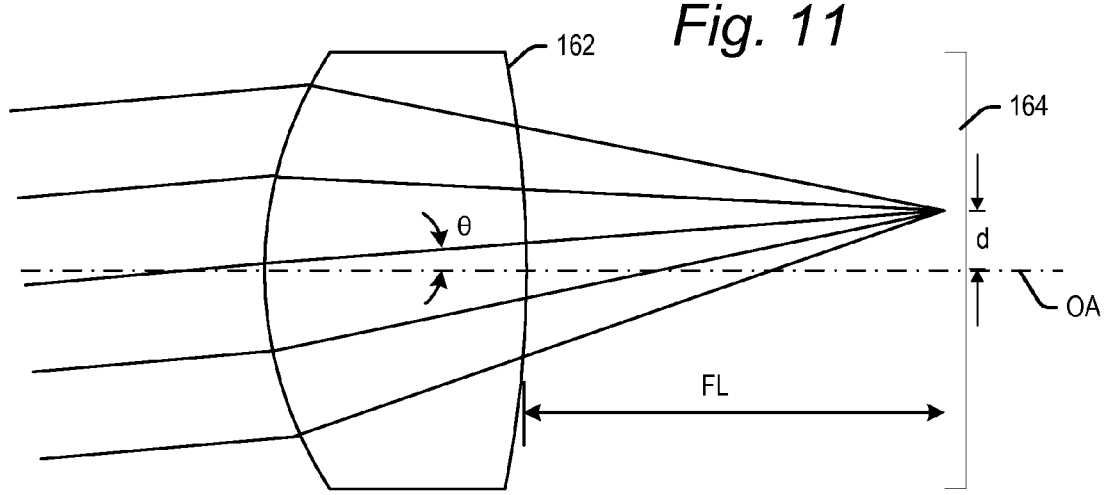
FIG. 11 is a top view illustrating the angular displacement sensitivity of the alignment detection assembly capable of measuring angular displacement.

Referring to the top view of the lens 162 shown in FIG. 11, as one such example, one of the display elements 104, 106 has undergone a yaw rotation (i.e., about the Y axis into and out of the page). In the description that follows, it will be assumed that it is display element 104 that has been angularly displaced and that display element 106 remains aligned and parallel in the head mounted display device 100. As such, the collimated light from light sources from the first group 130 (mounted on the display element 104) shifts on the image plane 164 of camera 160 as explained below. In such an example, the collimated light from light sources from the second group 140 (mounted on the display element 106) may remain focused on image plane 164 at the optical axis of the collimated lens 162.

It is understood that the display element 106 may angularly displace instead of the display element 104, in which case light from the light sources in the second group 140 would shift on the image plane 164, while light from light sources in the first group 130 remains focused at the optical axis. It is further understood that both display elements 104 and 106 may angularly displace, independently of each other. This will result in a shift of the light from the first group 130 and a shift of the light from the second group 140 on the image plane 164, where these shifts of the light from the first and second groups 130, 140 on the image plane 164 are independent from each other. The respective shifts may be detected and analyzed to provide angular displacements of both display elements 104, 106, which may then be independently accounted for.

Referring back to FIG. 11, the display element 104 has angularly displaced in a yaw rotation, which has resulted in the collimated light from a light source from the first group 130 reflecting off of reflective element 150 and striking the collimated lens 162 in camera 160 at the angular displacement angle, θ, relative to the optical axis, OA, of the collimated lens 162. This results in the light focusing on the image plane a distance, d, away from the optical axis, OA. Assuming an ideal lens, the magnitude of the angular displacement angle θ is given by the equation:

$$\tan \theta = d/FL \tag{1}$$

where FL is the focal length of the collimated lens. Once the magnitude of angular displacement angle θ is known, this information may be passed from the alignment detection assembly 102 to the processing unit 108 for the processing unit 108 to correct for the angular displacement by adjusting the displayed image to the display element 104 as explained below.

Figure 12:
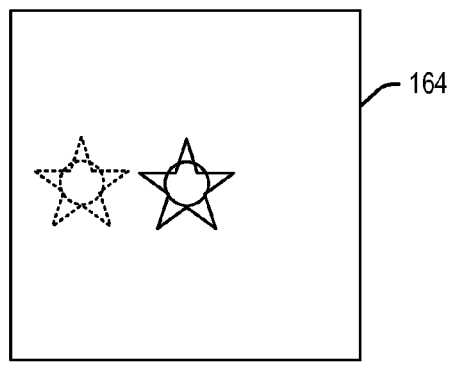
FIGS. 12-16 are front views of a photo-detector image plane of a camera of an alignment detection assembly detecting different angular displacements according to embodiments of the present technology.

In addition to the magnitude, the angular direction (pitch, yaw and/or roll) of the angular displacement may also be detected and used to adjust the displayed image. For example, referring to FIG. 12, a yaw rotation of display element 104 will shift the light from the light sources in the first group 130 received in camera 160 horizontally left and right on the image plane 164. In the example of FIG. 12, light from two light sources, for example light sources 132 and 136, is shown in dashed lines shifted horizontally away from the optical axis on the image plane 164. As described above, in this example, the display element 106 remains aligned and parallel, and light from light sources in the second group 140 remains focused at the optical center.

Figure 13:
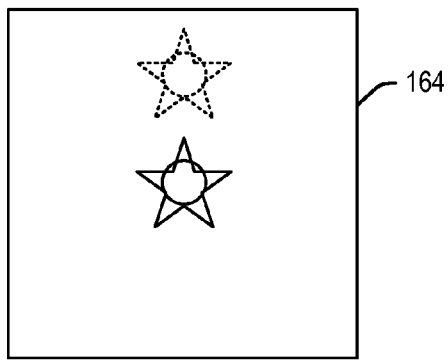

Referring now to FIG. 13, a roll rotation of display element 104 will shift the light from the light sources in the first group 130 received in camera 160 vertically up and down on the image plane 164. In the example of FIG. 13, light from two light sources, for example light sources 132 and 136, is shown in dashed lines shifted vertically away from the optical axis on the image plane 164. As described above, in this example, the display element 106 may remain aligned and parallel, and light from light sources in the second group 140 remains focused at the optical center.

Figure 14:
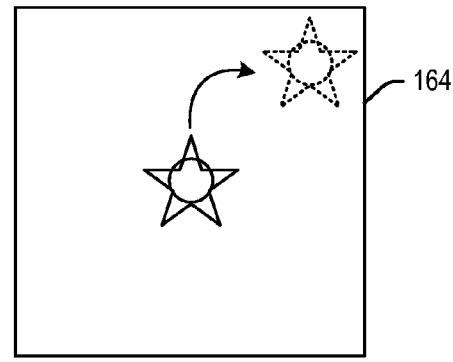

Referring now to FIG. 14, a pitch rotation of display element 104 will result in a shift of the light from the light sources in the first group 130 along an arcuate path away from the optical axis (except in the limited situation where the axis of rotation is concentric with light from the orthogonal light source, which situation is described below). In embodiments, this arcuate path (as shown by the arrow in FIG. 14) may be tracked by the alignment detection assembly 102 over time to recognize this movement and a pitch rotation.

Some combination of pitch, yaw and roll rotation will result in some combination of the displacements shown on the image planes 164 in FIGS. 12-14. Depending on where collimated light from the light sources received within camera 160 has shifted on the image plane 164, the alignment detection assembly 102 in conjunction with processing unit 108 is able to determine the pitch, yaw, roll or combination thereof of the light sources and display element that created the shifted light pattern.

As indicated in FIGS. 10-12, in many instances an angular rotation will shift the light received from two or more light sources the same or similar amounts. As such, a single light source may often be used alone to determine the pitch, yaw, roll and magnitude of an angular displacement of a display element 104, 106. As explained below, embodiments may operate using a single light source in the first group 130 and in the second group 140.

However, there are a few scenarios of angular displacement of a display element 104, 106 where more than one light source may be used to discern angular displacement. For example, there may be a pitch rotation of a display element, for example element 104, having an axis that is concentric with the collimated light emitted from the orthogonal light source 132 traveling to reflective element 150. In this instance, as rotation is about the axis of the collimated light from the orthogonal light source 132, the rotation will not be discernible on the image plane. This situation is illustrated for example in FIG. 15, where the circular pattern light from orthogonal light source 132 still shows up approximately at the optical axis of the collimated lens 162 on the image plane 164.

Figure 15:
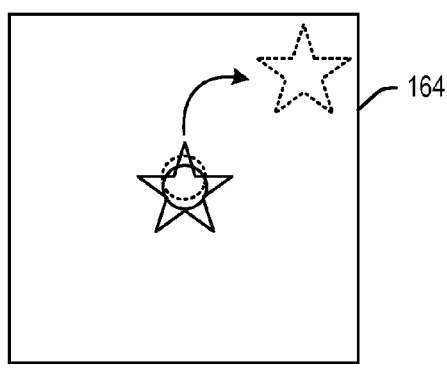
Figure 16:
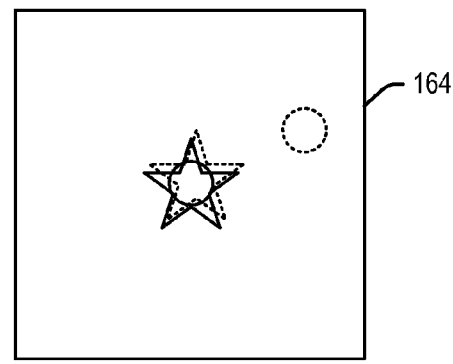

However, the isolated instance of pitch rotation about the collimated light from light source 132 is discernible by ensuring that light from at least one angled light source is received in camera 160. Where one of the display elements, for example display element 104, has been angularly displaced by pitch rotation having an axis of rotation about the collimated light from the orthogonal light source, the light from at least one angled light source will show up on the image plane as having shifted along an arcuate path, as shown in FIG. 15.

Thus, by configuring the positions of the light sources so that light from the orthogonal light source 132 and at least one other angled light source 134, 136, 138 are received within camera 160, the alignment detection assembly 102 is able to discern the various combinations of angular displacement.

Likewise, depending on where the collimated light from an angled light source 134, 136, 138 shows up on the image plane, alignment detection assembly 102 is able to use that information to derive most combinations of angular displacement of the display element 104. However, there will be a combination of pitch and yaw rotation which may have an axis concentric about the collimated light emitted from an angled light source. In this instance, as rotation is about the axis of the collimated light from the angled light source, it will not be discernible on the image plane, as shown for example by the dashed star in FIG. 16.

However, this isolated instance of angular displacement about the collimated light from one of the angled light sources is discernible by ensuring that light from at least the orthogonal light source or one other angled light source is received in camera 160. Where one of the display elements, for example display element 104, has been angularly displaced by pitch and yaw rotation having an axis of rotation about the collimated light from an angled light source, the light from at least one other light source will show up on the image plane as having shifted horizontally and along an arcuate path, as shown by the dashed circle in FIG. 16.

Again, examples of angular displacement of display element 104 and the associated light sources in the first group 130 have been described above. The above description would apply in the same manner to angular displacement of the display element 106 and the associated light sources in the second group 140. The alignment detection assembly 102 is capable of measuring angular displacement of one of the display elements, or both of the display elements independently of each other.

Thus, by configuring the positions of the light sources so that light from one of the angled light sources and at least one other light source (orthogonal or angled), the alignment detection assembly 102 is able to discern the various combinations of angular displacement. As explained below, the alignment detection assembly 102 may be configured using angled light sources (and no orthogonal light source) so that light from at least two angled light sources is received in camera 160. This is sufficient to discern the various possible combinations of rotation. As is further explained below, the system may be configured using a single orthogonal light source or a single angled light source in each group 130, 140. Such an embodiment may not be able to discern a situation where the axis of rotation is concentric with the light source, but it will provide angular displacement in most situations and is contemplated as an embodiment herein.

Figure 17:
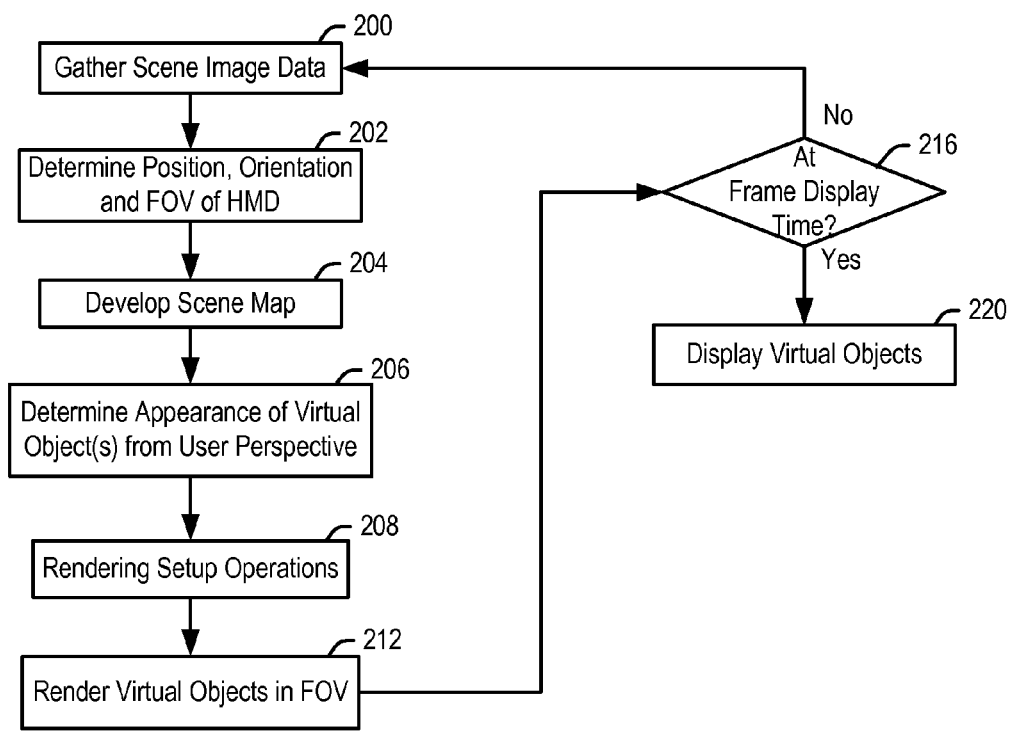
FIG. 17 is a high level flowchart of the operation of the head mounted display device according to embodiments of the present technology.
Figure 18:
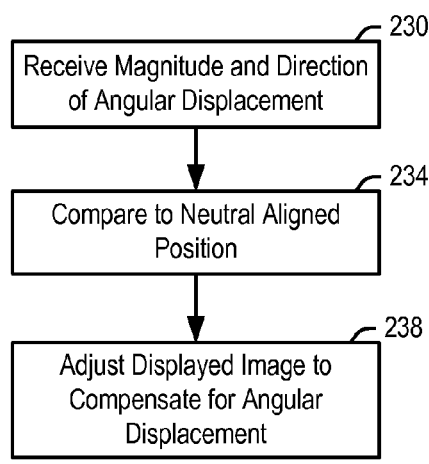
FIG. 18 are further details of step 206 for determining the appearance of virtual objects to be displayed on the head mounted display device according to embodiments of the present technology.

Once alignment detection assembly 102 determines the magnitude and direction of the angular displacement for display elements 104 and/or 106, the virtual images displayed to respective display elements 104 and/or 106 may be adjusted to correct for the determined angular displacement. This correction ensures that images are displayed to the respective display elements 104 and 106 with the proper binocular disparity and maintains a suitable three-dimensional mixed reality or wholly virtual experience. FIG. 17 is a high-level flowchart illustrating some of the steps performed by the head mounted display device 100 in presenting a mixed reality or wholly virtual experience.

In step 200, the head mounted display device 100 may gather data from the scene. This may include image data sensed by the scene facing camera 120. In step 202, the system determines the x, y and z positions, the orientation and the FOV of the head mounted display device 100. With the knowledge of the scene and the user's position, a scene map may be developed in step 204 identifying the geometry of the scene as well as the geometry and positions of objects within the scene. In embodiments, the scene map generated in a given frame may include the x, y and z positions of real-world objects and virtual objects in the scene.

In step 206, the system may use the scene map of the user position and FOV to determine the position and appearance of virtual objects from the user's perspective at the current time. Part of step 206 may include adjusting the position of virtual objects displayed to display elements 104 and/or 106 based on feedback from the alignment detection assembly 102. Further details of step 206 as it pertains to the feedback from the alignment detection assembly 102 are described in greater detail with respect to the flowchart of FIG. 18.

In step 230, the processing unit 108 may receive the magnitude and direction (pitch, yaw, roll or a combination thereof) of the angular displacement for the display elements 104 and/or 106 from the alignment detection assembly 102. In step 234, the processing unit 108 may compare the data received in step 230 to neutral, aligned positions of the display elements 104, 106.

In particular, as described above, in one theoretical example, when the display elements 104, 106 are aligned and parallel within the head mounted display device 100, the collimated light from the light sources received in the camera 160 from the first and second groups 130, 140 converge to the optical axis of the collimated lens 162 on the image plane 164. However, in other examples, it may be that the neutral positions (i.e., initial position(s) at which the display elements display virtual images with the proper binocular disparity) do not result in the collimated light received from the light sources in groups 130, 140 converging to the optical axis of the collimated lens 162 on the image plane 164. Owing to tolerances and other factors, the neutral position for light from one or more of the light sources in the first and second groups 130, 140 may deviate from the optical axis on the image plane.

In practice, the alignment detection assembly 102 may undergo a calibration process prior to use. In this calibration process, with the display elements 104, 106 properly positioned, readings may be taken as to where light from each of the light sources strikes the image plane, and how that light shifts upon inducing an angular displacement in pitch, yaw and roll in each of the display elements 104, 106. This information may be stored in memory of the processing unit 108 and used as a basis for comparison in step 234.

In step 238, based on the results of the comparison in step 234, the processing unit 108 may adjust the position of virtual objects to be displayed to the display element 104 and/or display element 106. In particular, the processing unit 108 may adjust the position of virtual objects to be displayed in a display element 104, 106 to compensate and in effect cancel out any angular displacement of that display element 104, 106 relative to its neutral position.

In embodiments, the steps 230-238 relating to adjusting the displayed image based on angular displacement may take place each time through the loop of steps 200-220 in real time. In further embodiments, the steps 230-238 may take place periodically, and not in real time. For example, receiving feedback from the alignment detection assembly 102 each time through the loop of FIG. 17, the system may respond to high frequency oscillations of display elements 104, 106 or components of the alignment detection assembly 102. If it is desired to filter out this level of sensitivity, the system may receive feedback from the alignment detection assembly less frequently. As one example, it may provide feedback at 10-20 frames per second, though it may be higher or lower than that in further embodiments.

Referring again to FIG. 17, once virtual object data is received, the processing unit 108 may perform rendering setup operations in step 208 for the virtual objects which are to be rendered using the scene map and the user's FOV. The setup rendering operations in step 208 may include common rendering tasks associated with the virtual object(s) to be displayed in the final FOV. These rendering tasks may include for example, shadow map generation, lighting, and animation. In embodiments, the rendering setup step 208 may further include a compilation of likely draw information such as vertex buffers, textures and states for virtual objects to be displayed in the predicted final FOV.

In step 212, a graphics processing unit of processing unit 108 may next render images to be displayed to the respective display elements 104, 106. Portions of the rendering operations may have already been performed in the rendering setup step 208 and periodically updated. In step 216, the processing unit 108 checks whether it is time to send rendered images to the display elements 104, 106, or whether there is still time for further refinement of the image using more recent position feedback data from the head mounted display device 100 and alignment detection assembly 102.

If it is time to display an image, the images for the one or more virtual objects are sent to microdisplays 122 in the display elements 104 and 106 in step 220 to be displayed in the respective display elements at the appropriate pixels. On the other hand, where it is not yet time to send a frame of image data to be displayed in step 216, the processing unit may loop back to step 200 for more updated data to further refine the predictions of the final FOV and the final positions of virtual objects in the FOV. The processing steps 200 through 220 are described above by way of example only. It is understood that one or more of these steps may be omitted in further embodiments, the steps may be performed in differing order, or additional steps may be added. A more detailed flow of the operation of the head mounted display device 100 in one example is set forth in U.S. Published Patent Application No. 2012/01272284, entitled, "Head-Mounted Display Device Which Provides Surround Video," mentioned above.

Figure 19:
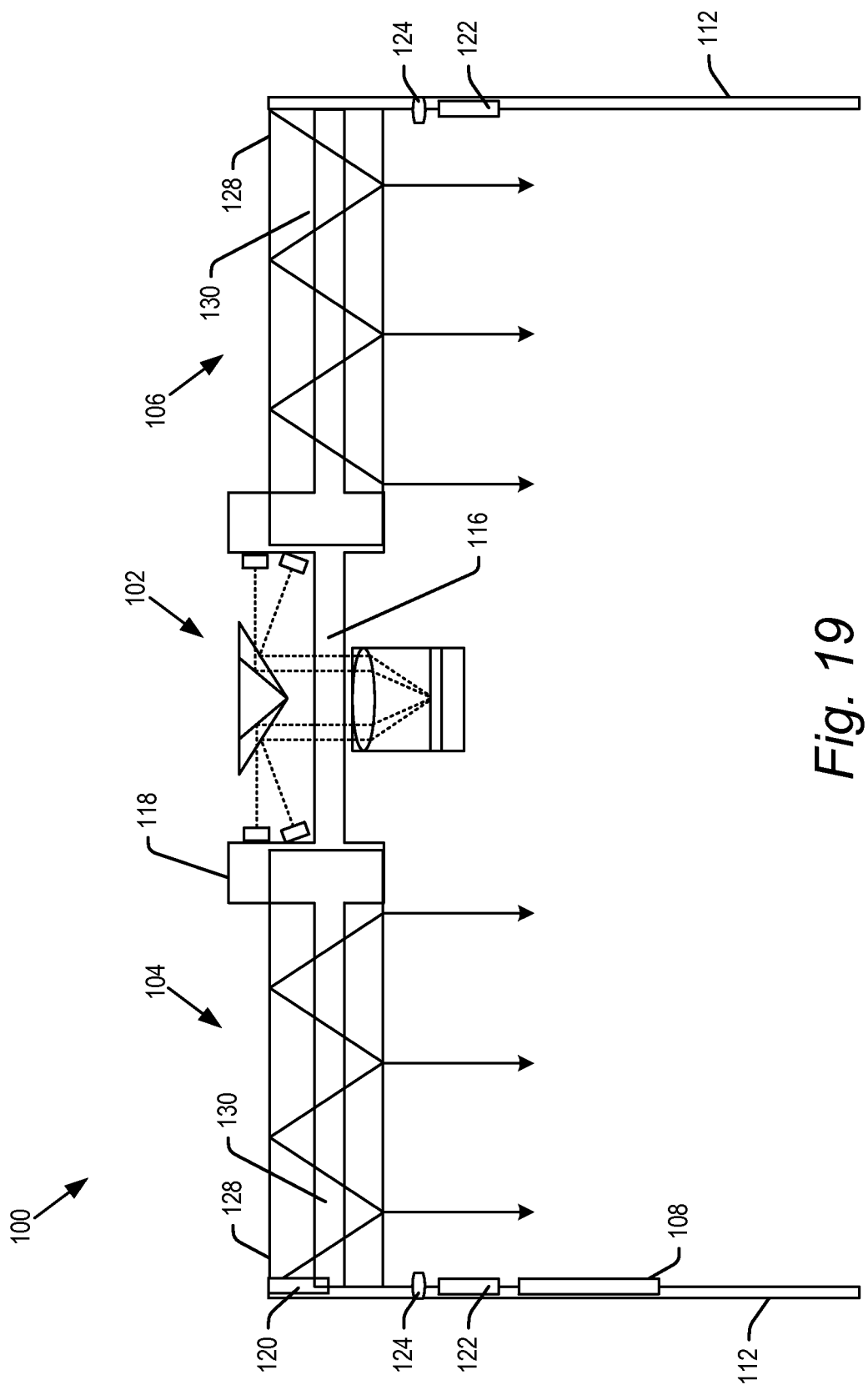
FIG. 19 is a top view of a head mounted display device including an alignment detection assembly according to an alternative embodiment of the present technology.

In the embodiments described above, the head mounted display device 100 includes an IPD adjustment mechanism 126 for adjusting the IPD, and the alignment detection assembly 102 includes components providing information on IPD adjustment. In a further embodiment shown in FIG. 19, an alignment detection assembly 102 in accordance with the present technology may be used with the head mounted display device 100 where the IPD adjustment mechanism 126 is omitted and there is no IPD adjustment. In FIG. 19, components having the same reference numerals as in FIG.

1 may be structurally and operationally the same as described above with respect to FIG. 1 with the possible exception of alignment detection assembly 102 as noted below.

Figure 20:
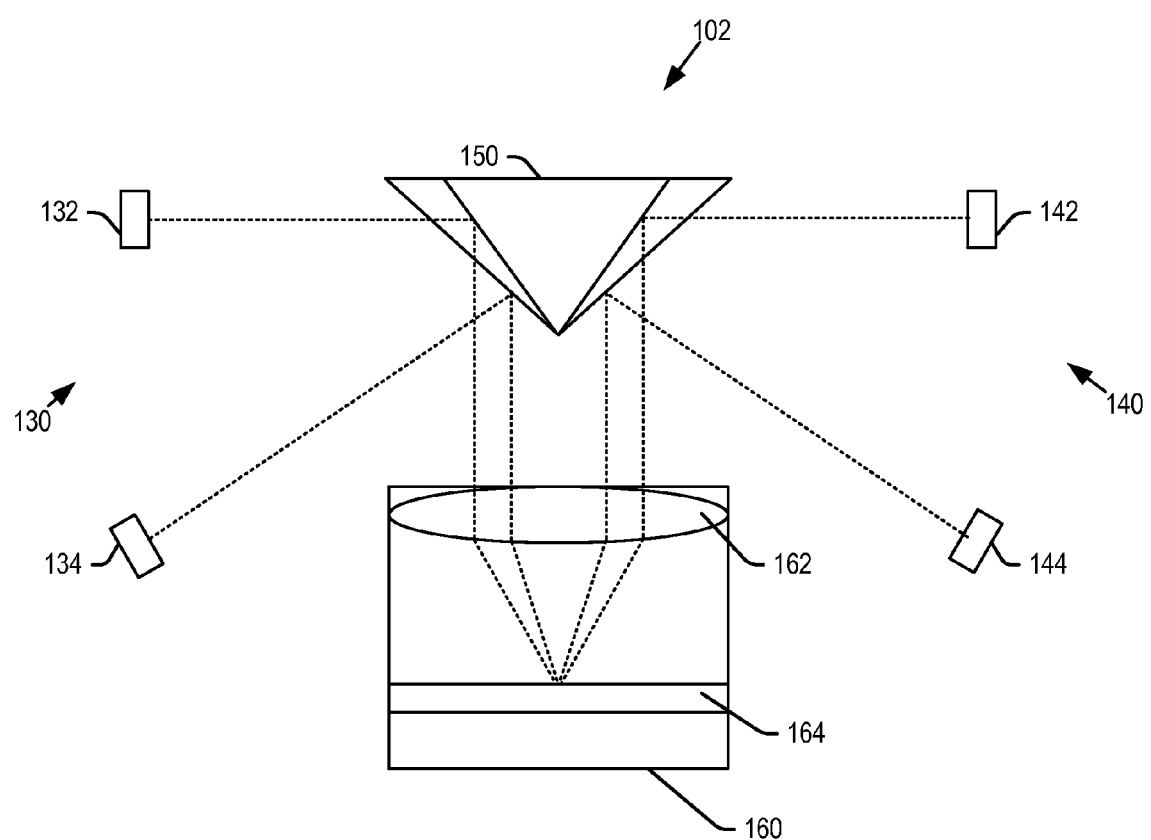
FIG. 20 is an enlarged top view of the alignment detection assembly according to the embodiment of FIG. 19.

FIG. 20 shows an enlarged top view of the alignment detection assembly 102 of FIG. 19. The alignment detection assembly 102 of FIG. 20 may include the same or similar components to those described above, including for example a multifaceted reflective element 150 and a camera 160 including a collimated lens 162 and photo-detector image plane 164. The alignment detection assembly 102 of FIG. 20 may also include first and second groups of light sources 130, 140 as described above. However, as there is no IPD adjustment, there is no need for multiple angled light sources in the first and second groups 130, 140.

In the embodiment shown in FIG. 20, there may be a single orthogonal light source 132 and a single angled light source 134 in the first group 130. The second group 140 may include the same two light sources. The orthogonal light sources 132, 142 may reflect off a first set of faceted side surfaces on reflective element 150, and the angled light sources 134, 144 may reflect off a second set of faceted side surfaces on reflective element 150 as described above. Light from each of these light sources may be reflected down into camera 160 and imaged on image plane 164 through collimated lens 162 to detect angular displacement as described above. As previously indicated, embodiments of the present technology operating with IPD adjustment may also operate using an alignment detection assembly 102 as shown in FIG. 20.

Figure 21:
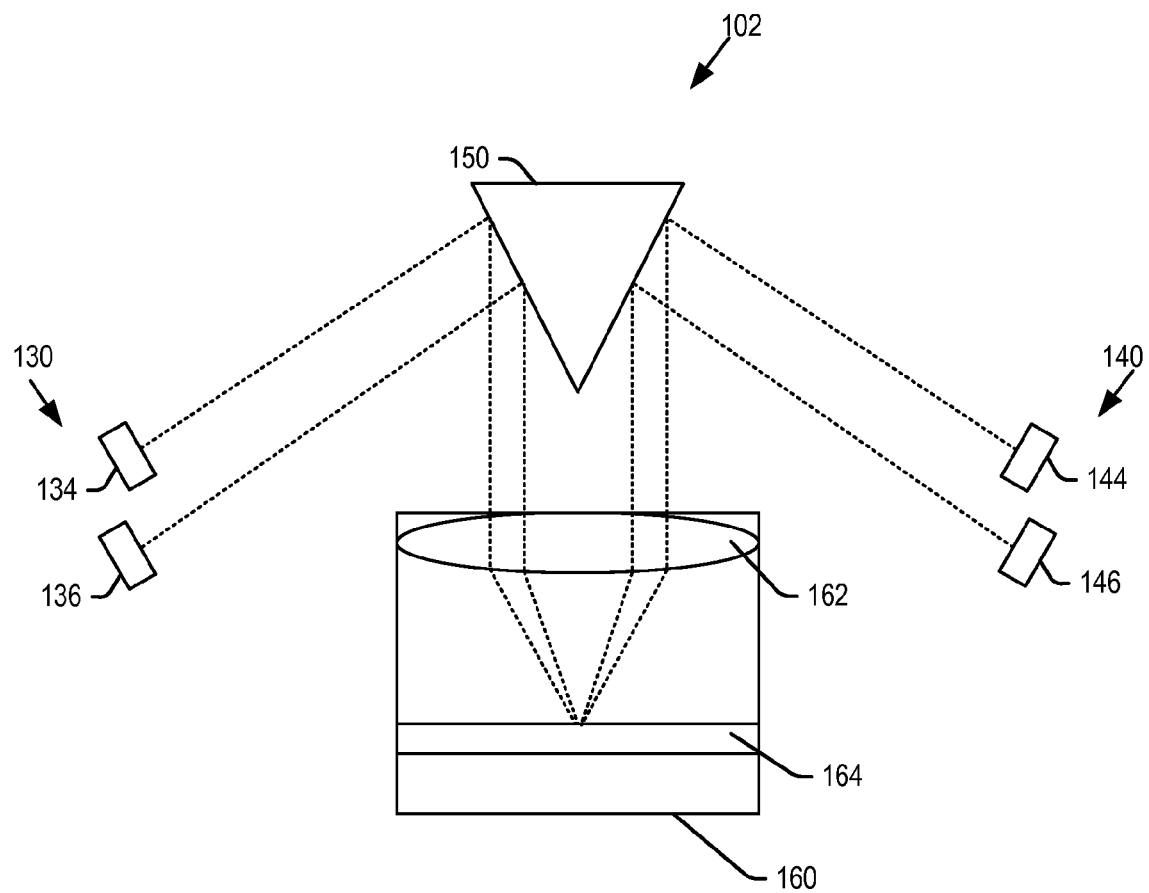
FIG. 21 is an enlarged top view of the alignment detection assembly according to an alternative embodiment of the present technology.

The orthogonal light sources 132, 142 described above have advantages when there is IPD adjustment in that the position of the light from the orthogonal light sources on the image plane 164 does not change with a change in IPD. However, in embodiments where there is no IPD adjustment, the orthogonal light source may be omitted as shown in FIG. 21. In the embodiment of FIG. 21, each of the first and second groups 130, 140 includes two angled light sources as described above. Light from each of these light sources may be reflected down into camera 160 and imaged on image plane 164 through collimated lens 162 to detect angular displacement as described above. As previously indicated, embodiments of the present technology operating with IPD adjustment may also operate using an alignment detection assembly 102 as shown in FIG. 21.

Figure 22:
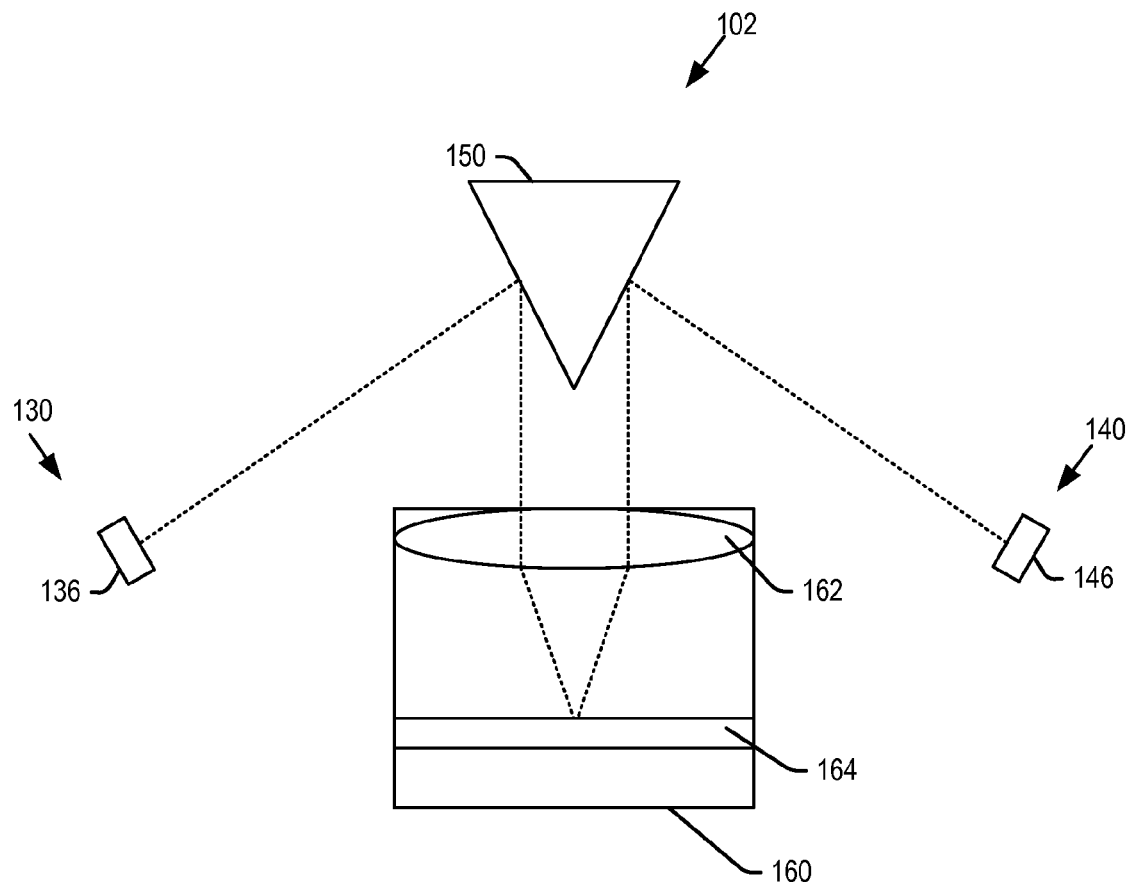
FIG. 22 is an enlarged top view of the alignment detection assembly according to a further alternative embodiment of the present technology.

FIG. 22 is similar to the embodiment shown in FIG. 21, but each of the first and second groups 130, 140 includes a single light source. In the illustrated embodiment, the light source is an angled light source as described above, but the light source may alternatively be an orthogonal light source as described above. The alignment detection assembly 102 shown in FIG. 22 is capable of providing alignment information for most angular displacements of display elements 104 and 106. As previously indicated, embodiments of the present technology operating with IPD adjustment may also operate using an alignment detection assembly 102 as shown in FIG. 22.

The alignment detection assembly 102 as described above is able to detect angular displacement of the display elements 104, 106 as well as the IPD based on which angled light sources from the first and second groups 130, 140 registered within camera 160 and where that light imaged on image plane 164. In further embodiments, additional and/or alternative components may be provided within the alignment detection assembly 102 to provide detailed information of IPD and angular displacement.

For example, in one embodiment, instead of using angled light sources that emit a simple beam of light, the angled light sources may be configured to emit a patterned beam of light, for example including a center beam surrounded by a ring. This ring of light may be created by the use of ring mirrors within or associated with each of the angled light sources in the first and second groups 130, 140. Light reaching the collimated lens (not shown) associated with the light source parallel to the optical axis (such as the center beam) may be transmitted through the collimated lens focused at infinity. On the other hand, light reaching the light source collimated lens at nonparallel angles (for example, light from a portion of the light ring) will be shifted in the same manner as explained above with regard to angled light striking collimated lens 162.

Figure 23:
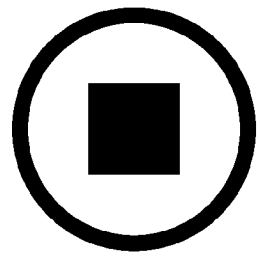
FIGS. 23 and 24 are light patterns received on an image plane of a camera to provide information as to the alignment of a light source with the camera and inter-pupillary distance.
Figure 24:
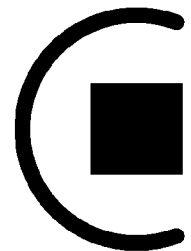

With such an arrangement, where an angled light source is spatially aligned and concentric with the camera 160 and collimated lens 162, the pattern on the image plane 164 may be a spot with a surrounding ring as shown in FIG. 23 (as noted above, the central beam may be shaped, a square in the illustrated example, to distinguish it from the other angled light sources in a group). On the other hand, where an angled light source is not aligned and not concentric with camera 160, the pattern on the image plane 164 may be a spot with a crescent shape as shown in FIG. 24. The crescent shape is caused by vignetting by the camera lens or LED lens apertures. This vignetting is deliberately designed to cause the change in pattern. The extent of the crescent (and possibly the central spot) which registers on the image plane 164 may be used to determine the alignment of the angled light source with the camera. From this information, IPD may be determined. It is understood that patterned light as shown in FIGS. 23 and 24 from more than one angled light source in a group 130, 140 may be received in the camera 160 at the same time.

It is further understood that other configurations of light sources may be provided. As one further example, a two-dimensional grid of light sources may be used, such as for example an array of collimated LEDs each focused at infinity. The light pattern resulting from those LEDs in the array which get imaged on the image plane 164 may be used to determine the alignment of the light source array with the camera. From this information, IPD may be determined.

In embodiments described above, the alignment detection assembly is insensitive to linear displacement of the display elements 104, 106 to allow measurement of angular displacement of the display elements without being confounded by linear displacement. Linear displacement upon X-axis IPD adjustment is given by the pattern of light from the angled light sources on the camera 160. In further embodiments, additional/alternative components may be provided for indicating X, Y and/or Z linear displacements of the display elements 104, 106.

One such embodiment may use Moire patterns to discern linear displacement. In such an embodiment, a first shadow mask may be placed over a light source affixed to a display element 104, 106. The first shadow mask may be patterned with a number of parallel rectangular slits through which the light from the light source may pass. A second patterned shadow mask may be placed in front of the image plane 164. The second patterned shadow mask may be similar to the first shadow mask, but rotated at an oblique angle relative to the first patterned shadow mask. This embodiment may operate with lenses on the light source and camera that are not collimated.

The two patterned shadow masks together will result in two grids of light incident on the image plane 164 forming an interference pattern known as a Moire pattern. Such interference patterns change dramatically with small changes in relative movement of the two grids of light. These pattern changes may be detected and correlated with a quantifiable linear displacement of one grid (on the light source) relative to the other grid (on the camera). Depending on the orientation of the light source and first patterned shadow mask, this embodiment may be used to provide information on linear displacement in the X-direction or Y-direction of the display elements 104, 106.

The embodiments described above have used an optical alignment detection assembly 102 for detecting angular displacement of display elements 104, 106. It is understood that systems other than optical systems may be used for detecting this angular displacement. As one further example, a mechanical system may be used. In one such example, a first capacitive plate may be affixed to the display element 104 and a second capacitive plate may be affixed to a reference position on the head mounted display device 100, such as for example the frame 118. The first and second plates may be placed near to and facing each other in a parallel relation, with a small air gap provided between the plates. A similar arrangement may be provided for a third plate affixed to the display element 106 and a fourth plate juxtaposed thereto and affixed to the reference position on the head mounted display device 100.

A charge differential may be created between the first pair of plates, and a charge differential between the second pair of plates. Thereafter, capacitance in the respective pairs can be measured in a variety of known ways given the equation:

$$I=C*dV/dt, \qquad (2)$$

where dV/dt is the change in voltage over time, C is the capacitance and I is the current. The measured capacitance is linearly related to the distance between the plates in the respective pairs. Under one interpretation, one plate may be considered an emitter and the other a sensor, with the flow of electrons therebetween. Assuming a small translation (capacitance change is dominated by distance change, not overlap change), the angular offsets in the plates in each pair can be used to discern the rotation of the display elements about the axis of rotation in the plane of the capacitors. If desired, additional pairs of capacitive plates may be provided in different orthogonal planes to discern rotation of the display elements about different orthogonal axes.

In a different mechanical system, it is conceivable that strain gauges may be affixed to the display elements 104, 106. In such an embodiment, the strain gauges may be used to provide linear and/or angular displacement of the display elements 104, 106.

FIG. 25 is a block diagram describing the various components of processing unit 108. FIG. 25 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 100 via band interface 302 and band interface 232, display in buffer 338 in communication with head mounted display device 100 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication device 346 can include a Wi-Fi enabled communication device, BluTooth communication device, infrared communication device, etc. The USB port can be used for example to load data or software onto processing unit 108, as well as charge processing unit 108. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374. Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 100.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for detecting angular displacement of a first display element of a pair of first and second display elements relative to a reference position on a head mounted display device for displaying virtual images on the display element, the pair of display elements having surfaces through which light passes, the surfaces lying tangent to a reference plane, the system comprising:
    an alignment detection assembly, comprising:
    at least two emitters for determining the alignment of the first display element and not the second display element, the at least two emitters affixed at one of the display element and the reference position, a first emitter of the at least two emitters emitting light at an angle that is oblique to the reference plane,
    a sensor affixed at the one of the display element and the reference position not including the emitter; and
    a processing unit in communication with the alignment detection assembly and receiving feedback from the sensor relating to positions on the sensor where light from the at least two emitters is incident, the processing unit determining the angular displacement of the display element based on the positions of the light from the at least two emitters on the sensor.

2. The system of claim 1, wherein the emitter is a light source and the sensor is a camera comprising an image plane for receiving light from the light source.

3. The system of claim 2, wherein the light source is one of an LED and a laser.

4. The system of claim 1, further comprising a frame for supporting the display element, the reference position being a position on the frame.

5. The system of claim 1, wherein a second emitter of the at least two emitters emits light at an angle that is oblique to the reference plane.

6. The system of claim 1, wherein a second emitter of the at least two emitters emits light at an angle that is parallel to the reference plane.

7. A system for detecting angular displacement of a first display element relative to a reference position on a head mounted display device for displaying virtual images to the first display element and a second display element with binocular disparity, the system comprising:
   an alignment detection assembly, comprising:
   a group of light sources for emitting light, the group of light sources comprising an orthogonal light source, the orthogonal light source emitting a light in a first direction along which the distance between the first and second display elements are adjusted, a direction of light emitted from the orthogonal light source in the group of light sources changing upon the angular displacement of the first display element and the group of light sources comprising one or more angled light sources, the one or more angled light sources emitting light in a second direction oblique to the first direction, the direction of light emitted from the one or more angled light source changing upon a linear displacement of the first display element,
   a camera for receiving light from two or more light sources in the group of light sources, the camera comprising:
   a collimated lens for receiving the light from the two or more light sources, and
   an image plane for receiving light through the collimated lens, the camera registering the angular displacement of the first display element while being insensitive to a linear displacement of the display element; and
   a processing unit in communication with the alignment detection assembly and receiving feedback from the camera, the processing unit determining the angular displacement of the first display element from the feedback and the processing unit adjusting a display of the virtual images to the first display element to correct a change in the binocular disparity due to the angular displacement of the first display element.

8. The system of claim 7, further comprising a reflective element for receiving the light from the orthogonal and one or more angled light sources and redirecting the light from the orthogonal and one or more angled light sources into the camera.

9. The system of claim 7, wherein the camera receives light from the one or more light sources, the processing unit further capable of determining angular displacement of the second display element from the light received in the camera from the one or more light sources in the second group, the processing unit adjusting a display of the virtual images to the second display element to correct a change in the binocular disparity due to the angular displacement of the second display element.

10. The system of claim 9, wherein the reference position is a position on the head mounted display device different than the first and second display elements, the processing unit determining angular displacement of the first and second display elements independently of each other.

11. The system of claim 7, further comprising an adjustment mechanism for adjusting a distance between the first and second display elements, and
   a multifaceted prism reflecting light from the orthogonal light source and at least one of the two or more angled light sources into the camera.

12. The system of claim 11, wherein light from the two or more angled light sources strikes the prism at locations that change as the distance between the first and second light sources changes, the two or more angled light sources positioned so that,
   when the first and second display elements are a first distance away from each other, light from a first angled light source is reflected by the prism into the camera and light from a second angled light source is not reflected by the prism into the camera, and
   when the first and second display elements are a second distance away from each other, light from the second angled light source is reflected by the prism into the camera and light from the first angled light source is not reflected by the prism into the camera.

13. The system of claim 12, wherein the processing unit receives information of which angled light source is providing light received in the camera, the processing unit determining whether the first and second display elements are spaced from each other the first or second distances based in which angled light source is providing light received in the camera.

14. The system of claim 12, wherein light from the orthogonal light source strikes the prism at a location that stays approximately the same as the distance between the first and second display elements changes.

15. A method of detecting angular displacement of a first display element relative to a reference position on a head mounted display device for displaying virtual images to the first display element and a second display element with binocular disparity, the method comprising:
   (a) collimating light from a first light source positioned at the first display element;
   (b) collimating light from a second light source positioned at the first display element;
   (c) directing the collimated light from the first and second light sources onto a sensor of a camera; and
   (d) determining an angular displacement of the first display element, independently of the second display element, based on positions at which light from the first and second light sources strike the sensor.

16. The method of claim 15, further comprising the step (f) of adjusting a display of the virtual images to the first display element to correct a change in the binocular disparity due to the angular displacement of the first display element.

17. The method of claim 15, further comprising:
   (g) collimating light from a third light source on the second display element;
   (h) collimating light from a fourth light source on the second display element;
   (i) directing the collimated light from the third and fourth light sources into the camera; and
   (k) determining an angular displacement of the second display element based on positions at which light from the third and fourth light sources strike the sensor and based on positions of the light from the third and fourth light sources relative to each other on the sensor.

18. The method of claim 17, wherein said step (d) of determining an angular displacement of the first display element and said step (k) of determining an angular displacement of the second display element are independent of each other.

19. A system for detecting angular displacement of a first display element of a pair of first and second display elements relative to a reference position on a head mounted display device for displaying virtual images on the display element, the pair of display elements having surfaces through which light passes, the surfaces lying tangent to a reference plane, the system comprising:
   a first light source positioned at the first display element;
   a second light source positioned at the first display element;

a sensor for receiving light from the first and second light sources onto a sensor of a camera; and a processor for determining an angular displacement of the first display element, independently of the second display element, based on positions at which light from the first and second light sources strike the sensor.

20. The system of claim 19, further comprising a collimating lens for focusing light from the first and second light sources incident on the collimating lens at a central reference point on the sensor.

21. The system of claim 20, further comprising a reflective element for directing light from the first and second light sources toward the collimating lens.

22. The system of claim 19, the processor further determining an angular displacement of the first display element based on positions of the light from the first and second light sources on the sensor relative to the central reference point.

23. The system of claim 22, the processor further determining an angular displacement of the first display element based on positions of the light from the first and second light sources on the sensor relative to each other.

* * * * *